US012026348B2

(12) United States Patent
Louch et al.

(10) Patent No.: US 12,026,348 B2
(45) Date of Patent: Jul. 2, 2024

(54) PRESENTING VISUAL INDICATORS OF HIDDEN OBJECTS

(71) Applicant: Apple Inc., Cupertino, CA (US)

(72) Inventors: John Louch, Boulder, CO (US); Alessandro Sabatelli, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 15/650,637

(22) Filed: Jul. 14, 2017

(65) Prior Publication Data

US 2018/0032229 A1    Feb. 1, 2018

Related U.S. Application Data

(63) Continuation of application No. 13/165,860, filed on Jun. 22, 2011, now abandoned.

(60) Provisional application No. 61/433,197, filed on Jan. 14, 2011.

(51) Int. Cl.
*G06F 3/04812*    (2022.01)
(52) U.S. Cl.
CPC ............................... *G06F 3/04812* (2013.01)
(58) Field of Classification Search
CPC ............... G06F 3/0481; G06F 3/04812; G06F 3/04817; G06F 3/0482
See application file for complete search history.

(56) References Cited

U.S. PATENT DOCUMENTS 5,305,435 A * 4/1994 Bronson ............... G06F 3/0481
715/775
5,473,745 A * 12/1995 Berry ................... G06F 3/0481
715/788
5,483,261 A    1/1996 Yasutake
5,488,204 A    1/1996 Mead et al.
5,644,737 A * 7/1997 Tuniman ............... G06F 3/0481
715/810
5,657,050 A * 8/1997 McCambridge .... G06F 3/04812
715/856

(Continued)

FOREIGN PATENT DOCUMENTS

EP    3273339 A1    1/2018
JP    2000-163031 A    6/2000

(Continued)

OTHER PUBLICATIONS

Non-Final Office Action dated Sep. 7, 2018, for U.S. Appl. No. 15/357,624, filed Nov. 21, 2016, 36 pages.

(Continued)

*Primary Examiner* — Michael Roswell
*Assistant Examiner* — William Wong
(74) *Attorney, Agent, or Firm* — Kubota & Basol LLP

(57) ABSTRACT

Generating for display an indicator of hidden objects in response to user input is disclosed. An input for moving a pointer presented in a user interface toward a first virtual boundary is received. The movement of the pointer toward the first virtual boundary is generated for display. An action is triggered in response to receiving input for movement of the pointer across the first virtual boundary after the pointer crosses the first virtual boundary. An object is generated for display in the user interface in response to receiving input for movement of the pointer across a second virtual boundary.

27 Claims, 16 Drawing Sheets

(56) References Cited

U.S. PATENT DOCUMENTS

| | | |
|---|---|---|
| 5,745,096 A | 4/1998 | Ludolph et al. |
| 5,745,109 A | 4/1998 | Nakano et al. |
| 5,745,111 A | 4/1998 | Cline et al. |
| 5,745,112 A | 4/1998 | Hirose |
| 5,757,371 A | 5/1998 | Oran et al. |
| 5,767,919 A | 6/1998 | Lee et al. |
| 5,825,352 A | 10/1998 | Bisset et al. |
| 5,835,079 A | 11/1998 | Shieh |
| 5,835,919 A | 11/1998 | Stern et al. |
| 5,874,958 A | 2/1999 | Ludolph |
| 5,880,411 A | 3/1999 | Gillespie et al. |
| 5,899,996 A | 5/1999 | Dysart et al. |
| 5,914,716 A | 6/1999 | Rubin et al. |
| 6,108,003 A | 8/2000 | Hall et al. |
| 6,133,898 A | 10/2000 | Ludolph et al. |
| 6,188,391 B1 | 2/2001 | Seely et al. |
| 6,243,724 B1 | 6/2001 | Mander et al. |
| 6,310,610 B1 | 10/2001 | Beaton et al. |
| 6,323,846 B1 | 11/2001 | Westerman et al. |
| 6,337,698 B1 | 1/2002 | Keely et al. |
| 6,392,675 B1 | 5/2002 | Becker et al. |
| 6,396,519 B1 | 5/2002 | Hall et al. |
| 6,448,986 B1 | 9/2002 | Smith |
| 6,559,873 B1 | 5/2003 | Dawkins et al. |
| 6,570,557 B1 | 5/2003 | Westerman et al. |
| 6,628,315 B1 | 9/2003 | Dawkins et al. |
| 6,664,983 B2 | 12/2003 | Ludolph |
| 6,677,932 B1 | 1/2004 | Westerman |
| 6,690,387 B2 | 2/2004 | Zimmerman et al. |
| 6,867,790 B1 | 3/2005 | Brooks |
| 7,015,894 B2 | 3/2006 | Morohoshi |
| 7,088,344 B2 | 8/2006 | Maezawa et al. |
| 7,184,064 B2 | 2/2007 | Zimmerman et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,770,120 B2 | 8/2010 | Baudisch |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,501,217 B2 | 11/2016 | Louch |
| 9,933,937 B2 | 4/2018 | Lemay et al. |
| 2001/0028365 A1 | 10/2001 | Ludolph |
| 2001/0035882 A1* | 11/2001 | Stoakley ............... G06F 3/0481 715/779 |
| 2002/0015024 A1 | 2/2002 | Westerman et al. |
| 2002/0015064 A1 | 2/2002 | Robotham et al. |
| 2002/0063740 A1* | 5/2002 | Forlenza ............... G06F 3/0481 715/856 |
| 2002/0130838 A1 | 9/2002 | Feierbach |
| 2002/0188619 A1 | 12/2002 | Low |
| 2003/0146927 A1 | 8/2003 | Crow |
| 2004/0036679 A1 | 2/2004 | Emerson |
| 2004/0150664 A1* | 8/2004 | Baudisch ............. G06F 3/0486 715/740 |
| 2005/0039147 A1 | 2/2005 | Ludolph et al. |
| 2005/0166162 A1 | 7/2005 | Kaneko |
| 2005/0190059 A1 | 9/2005 | Wehrenberg |
| 2005/0216866 A1 | 9/2005 | Rosen et al. |
| 2006/0010394 A1 | 1/2006 | Chaudhri et al. |
| 2006/0017692 A1 | 1/2006 | Wehrenberg et al. |
| 2006/0026521 A1 | 2/2006 | Hotelling et al. |
| 2006/0033724 A1 | 2/2006 | Chaudhri et al. |
| 2006/0112347 A1* | 5/2006 | Baudisch ............. G06F 3/0481 715/764 |
| 2006/0123353 A1* | 6/2006 | Matthews ............. G06F 3/0481 715/779 |
| 2006/0197753 A1 | 9/2006 | Hotelling |
| 2006/0242602 A1* | 10/2006 | Schechter ........... G06F 3/04817 715/838 |
| 2007/0200713 A1 | 8/2007 | Weber et al. |
| 2007/0240074 A1 | 10/2007 | Banks |
| 2007/0250511 A1 | 10/2007 | Endler et al. |
| 2007/0288860 A1 | 12/2007 | Ording et al. |
| 2008/0072177 A1* | 3/2008 | Santos ................. G06F 3/0482 715/821 |
| 2008/0187248 A1 | 8/2008 | Ikeda et al. |
| 2008/0229232 A1 | 9/2008 | Schulz et al. |
| 2008/0307335 A1* | 12/2008 | Chaudhri .............. G06F 3/0482 715/764 |
| 2008/0307350 A1* | 12/2008 | Sabatelli ............... G06F 3/0481 715/779 |
| 2008/0307351 A1 | 12/2008 | Louch et al. |
| 2009/0282359 A1 | 11/2009 | Saul et al. |
| 2009/0313567 A1 | 12/2009 | Kwon et al. |
| 2009/0327955 A1 | 12/2009 | Mouilleseaux et al. |
| 2010/0083190 A1* | 4/2010 | Roberts ............... G06F 3/04883 715/863 |
| 2010/0199208 A1* | 8/2010 | Tokunaga ........... G06F 3/03549 715/777 |
| 2010/0306692 A1 | 12/2010 | Baier et al. |
| 2011/0055741 A1 | 3/2011 | Jeon et al. |
| 2011/0055753 A1 | 3/2011 | Horodezky et al. |
| 2011/0087981 A1 | 4/2011 | Jeong et al. |
| 2011/0138295 A1* | 6/2011 | Momchilov .......... G06F 3/0484 715/740 |
| 2011/0138324 A1 | 6/2011 | Sweeney et al. |
| 2011/0209088 A1* | 8/2011 | Hinckley ............... G06F 3/0488 715/810 |
| 2011/0246918 A1 | 10/2011 | Henderson |
| 2011/0279354 A1 | 11/2011 | Tang et al. |
| 2011/0296351 A1* | 12/2011 | Ewing, Jr. ............. G06F 3/0483 715/841 |
| 2011/0314389 A1* | 12/2011 | Meredith ................. G06F 8/60 715/751 |
| 2012/0185789 A1 | 7/2012 | Louch |
| 2012/0185805 A1 | 7/2012 | Louch et al. |
| 2012/0306778 A1 | 12/2012 | Weeldreyer et al. |
| 2013/0055083 A1 | 2/2013 | Fino |
| 2013/0125067 A1 | 5/2013 | Moon et al. |
| 2014/0040834 A1 | 2/2014 | Thompson et al. |
| 2014/0072277 A1 | 3/2014 | Takao et al. |
| 2015/0067596 A1 | 3/2015 | Brown et al. |
| 2015/0100688 A1 | 4/2015 | Richardson et al. |
| 2015/0135109 A1 | 5/2015 | Zambetti et al. |
| 2016/0110056 A1 | 4/2016 | Hong et al. |
| 2016/0124756 A1 | 5/2016 | Sadler et al. |
| 2017/0070458 A1 | 3/2017 | Kunieda et al. |
| 2017/0123621 A1 | 5/2017 | Louch |
| 2018/0335937 A1 | 11/2018 | Hauenstein et al. |
| 2019/0187889 A1 | 6/2019 | Moon et al. |
| 2021/0181939 A1 | 6/2021 | Lee et al. |
| 2021/0240332 A1 | 8/2021 | Walkin et al. |
| 2023/0176716 A1 | 6/2023 | Walkin et al. |

FOREIGN PATENT DOCUMENTS

| | | |
|---|---|---|
| JP | 2002-342033 A | 11/2002 |
| WO | 2013/169849 A2 | 11/2013 |
| WO | 2014/105276 A1 | 7/2014 |

OTHER PUBLICATIONS

Anonymous. (Dec. 24, 2008). "Remove Items from the Dock," Switchtoamac located at http://switchtoamac.com/guides/mas-os-x/dock/remove-items-from-the-dock.html, last visited Nov. 29, 2012, pp. 1-2.

Carr, D.A. et al. (Sep. 1994). "Using Interaction Object Graphs to Specifiy Graphical Widgets," *Institute for Systems Research*, University of Maryland, College Park, MD, 32 pages. Originally cited as: David A. Carr et al. "Using Interaction Object Graphs to Specifiy Graphical Widgets," Dated Sep. 1994, Copyright 1994, 1995, 32 pages.

(56) References Cited

OTHER PUBLICATIONS

Final Office Action dated Jul. 18, 2013, for U.S. Appl. No. 13/112,459, filed May 20, 2011, 15 pages.
Final Office Action dated Oct. 15, 2013, for U.S. Appl. No. 13/165,860, filed Jun. 22, 2011, 11 pages.
Final Office Action dated Aug. 19, 2014, for U.S. Appl. No. 13/112,459, filed May 20, 2011, 14 pages.
Final Office Action dated May 21, 2015, for U.S. Appl. No. 13/165,860, filed Jun. 22, 2011, 16 pages.
Final Office Action dated Jan. 13, 2016, for U.S. Appl. No. 13/112,459, filed May 20, 2011, 14 pages.
Final Office Action dated Jan. 17, 2017, for U.S. Appl. No. 13/165,860, filed Jun. 22, 2011, 18 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Dec. 21, 2012, for U.S. Appl. No. 13/112,459, filed May 20, 2011, 14 pages.
Non-Final Office Action dated Mar. 15, 2013, U.S. Appl. No. 13/165,860, filed Jun. 22, 2011, 11 pages.
Non-Final Office Action dated Feb. 14, 2014, for U.S. Appl. No. 13/112,459, filed May 20, 2011, 14 pages.
Non-Final Office Action dated Sep. 2, 2014, U.S. Appl. No. 13/165,860, filed Jun. 22, 2011, 13 pages.
Non-Final Office Action dated Jun. 4, 2015, for U.S. Appl. No. 13/112,459, filed May 20, 2011, 14 pages.
Non-Final Office Action dated Apr. 8, 2016, for U.S. Appl. No. 13/165,860, filed Jun. 22, 2011, 17 pages.
Non-Final Office Action dated Jun. 29, 2017, for U.S. Appl. No. 15/357,624, filed Nov. 21, 2016, 34 pages.
Notice of Allowance dated Jul. 15, 2016, for U.S. Appl. No. 13/112,459, filed May 20, 2011, eight pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Thinkmacs, "Mac OS X Tutorial: Adding Icons to the Dock" (Sep. 20, 2010), [retrieved on Jul. 1, 2013], [retrieved from the internet URL:http://youtu.be/-PTItCAgzEM/, pp. 1-2.
Verizoneric. (Sep. 24, 2010). "Add & Remove Apps & Widgets on Android Smartphones," URL: https://www.youtube.com/watch?v-3170yTFE3xw/ , p. 1-23.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated May 3, 2018, for U.S. Appl. No. 15/357,624, filed Nov. 21, 2016, 41 pages.
Advisory Action received for U.S. Appl. No. 13/112,459, dated Dec. 4, 2013, 3 pages.
Final Office Action received for U.S. Appl. No. 15/357,624, dated May 1, 2019, 42 pages.
David et al., "Using Interaction Object Graphs to Specify Graphical Widgets", Sep. 1994, 32 pages.
Non-Final Office Action received for U.S. Appl. No. 17/167,007, dated Aug. 25, 2021, 24 pages.
International Search Report received for PCT Patent Application No. PCT/US2021/016478, mailed on Jul. 16, 2021, 7 pages.
Notice of Allowance received for U.S. Appl. No. 17/167,007, mailed on May 2, 2022, 5 pages.
Notice of Allowance received for U.S. Appl. No. 17/167,007, mailed on Sep. 15, 2022, 5 pages.

\* cited by examiner

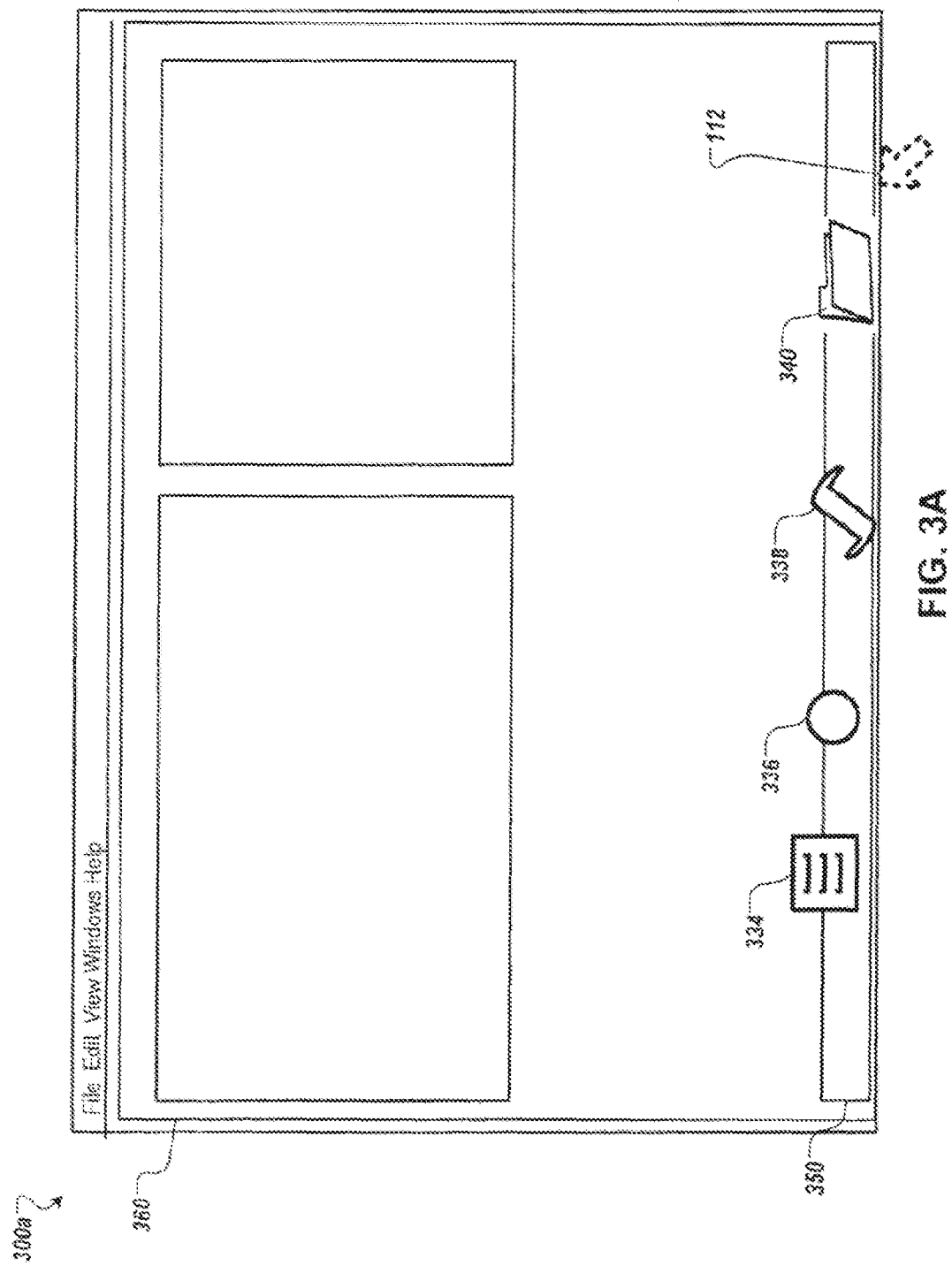

PRESENTING VISUAL INDICATORS OF HIDDEN OBJECTS

CROSS-REFERENCE TO RELATED APPLICATIONS

This application is a continuation of U.S. application Ser. No. 13/165,860, filed Jun. 22, 2011 and published on Jul. 19, 2012 as U.S. Publication No. 2012-0185805, which claims priority to U.S. Provisional Application No. 61/433,197, filed on Jan. 14, 2011, the contents of which are incorporated by reference herein in their entirety for all intended purposes.

TECHNICAL FIELD

This disclosure relates generally to generating for display visual indicators of hidden objects on a computing device.

BACKGROUND

Modern graphical user interfaces present graphical objects or items displayed on a screen to allow users to interact with various applications. Leading personal computer operating systems, such as Apple Mac OS®, provide user interfaces in which a dock is displayed in the user interface for access to applications and system resources. The dock can be any graphical object, such as a taskbar, menu, virtual button or other user interface element that allows a user to link to applications by viewing and selecting icons representing the applications. In addition to application icons, the dock can also include other graphical items that provide information or resources to a user, such as visual indicators of the status of various system components or other visual elements associated with different applications.

In some instances, the dock can be hidden from view when the user does not need access to items in the dock. For example, the user may not need access to the dock when the user interacts with an application or when a particular application is running in full-screen mode. In some implementations, the dock can be automatically hidden from view when the operating system determines that the user does not need to access the dock, such as after a certain amount of time has elapsed since the user's previous selection of an item in the dock. The hiding of the dock can also be performed in response to the user's movement of a visual cursor or pointer, such as automatically hiding the dock after a pointer is moved away from the dock for a certain amount of time. As the pointer is moved back within the region of the user interface previously occupied by the dock, the dock can be automatically presented again to allow the user to interact with the dock.

In certain instances, the hidden dock can reappear in the user interface even when a user does not need access to the dock. For example, if the dock is configured to reappear in the user interface when a pointer moves within the vicinity of the region previously occupied by the dock, the dock may reappear when the user is trying to access the region for a purpose other than retrieving an item from the dock. In some implementations, the dock can be located at an edge of the visible area of the user interface, such as at the bottom or side edge of a screen. When the dock is automatically hidden from view, the edge of the screen can be occupied by other graphical elements, such as portions of a window or application. The user may try to access the graphical elements at the edge of the screen after the dock is hidden from view, but may be hindered after the dock reappears in the user interface when the user-controlled pointer moves within the region. In other words, hidden objects such as the dock can be triggered to appear in a user interface even when reappearance of the hidden object is undesirable to the user.

SUMMARY

In a first general aspect, a method for displaying an indicator of hidden objects in response to user input is disclosed. An input for moving a pointer presented in a user interface toward a first virtual boundary is received. The movement of the pointer toward the first virtual boundary is generated for display. An action is triggered in response to receiving input for movement of the pointer across the first virtual boundary after the pointer crosses the first virtual boundary. An object is generated for display in the user interface in response to receiving input for movement of the pointer across a second virtual boundary.

Implementations can include any or all of the following features. The first virtual boundary is an edge of a visible area of the user interface. The second virtual boundary is an area beyond a visible area of the user interface. The action includes generating for display a visual indicator of the first virtual boundary or of a potential second action in response to further movement of the pointer. The visual indicator includes at least one of a change to a visual representation of the pointer or a change in color or luminance of a particular object in the user interface. The received input comprises input for a constant rate of movement as the pointer moves across the first virtual boundary, and wherein the action includes displaying movement of the pointer at a modified rate of movement after the pointer moves across the first virtual boundary, the modified rate of movement slower than a rate of movement of the pointer prior to crossing the first virtual boundary. The displayed object is previously hidden from view before receiving the input. The object is a docking element. The method further comprises generating for display a different object in the user interface in response to receiving input for movement of the pointer across a third virtual boundary. The action includes generating for display a first portion of the object in the user interface while a remaining portion of the object is hidden from view, and generated the object for display includes generating for display the remaining portion of the object with the first portion. Displaying the object occurs after a predefined amount of time during which the pointer remains beyond the second virtual boundary.

In a second general aspect, a computer program product is tangibly embodied in a computer-readable storage medium and includes instructions that, when executed, generate for display an indicator of hidden objects in response to user input and perform the following operations. An input for moving a pointer presented in a user interface toward a first virtual boundary is received. The movement of the pointer toward the first virtual boundary is generated for display. An action is triggered in response to receiving input for movement of the pointer across the first virtual boundary after the pointer crosses the first virtual boundary. An object is generated for display in the user interface in response to receiving input for movement of the pointer across a second virtual boundary.

Implementations can include any or all of the following features. The first virtual boundary is an edge of a visible area of the user interface. The second virtual boundary is an area beyond a visible area of the user interface. The action includes generating for display a visual indicator of the first virtual boundary or of a potential second action in response to further movement of the pointer. The visual indicator includes at least one of a change to a visual representation of the pointer or a change in color or luminance of a particular object in the user interface. The received input comprises input for a constant rate of movement as the pointer moves across the first virtual boundary, and wherein the action includes generating for display movement of the pointer at a modified rate of movement after the pointer moves across the first virtual boundary, the modified rate of movement slower than a rate of movement of the pointer prior to crossing the first virtual boundary. The displayed object is previously hidden from view before receiving the input. The object is a docking element. The instructions can also generate for display a different object in the user interface in response to receiving input for movement of the pointer across a third virtual boundary. The action includes generating for display a first portion of the object in the user interface while a remaining portion of the object is hidden from view, and generating the object for display includes generating for display the remaining portion of the object with the first portion. Generating the object for display occurs after a predefined amount of time during which the pointer remains beyond the second virtual boundary.

The details of one or more implementations of managing items in a user interface are set forth in the accompanying drawings and the description below. Other features, aspects, and advantages will become apparent from the description, the drawings, and the claims.

BRIEF DESCRIPTION OF THE DRAWINGS

FIGS. 3A-3B illustrate an exemplary user interface showing toggling of different docks in response to user input.

Like reference symbols in the various drawings indicate like elements.

DETAILED DESCRIPTION

Figure 1:
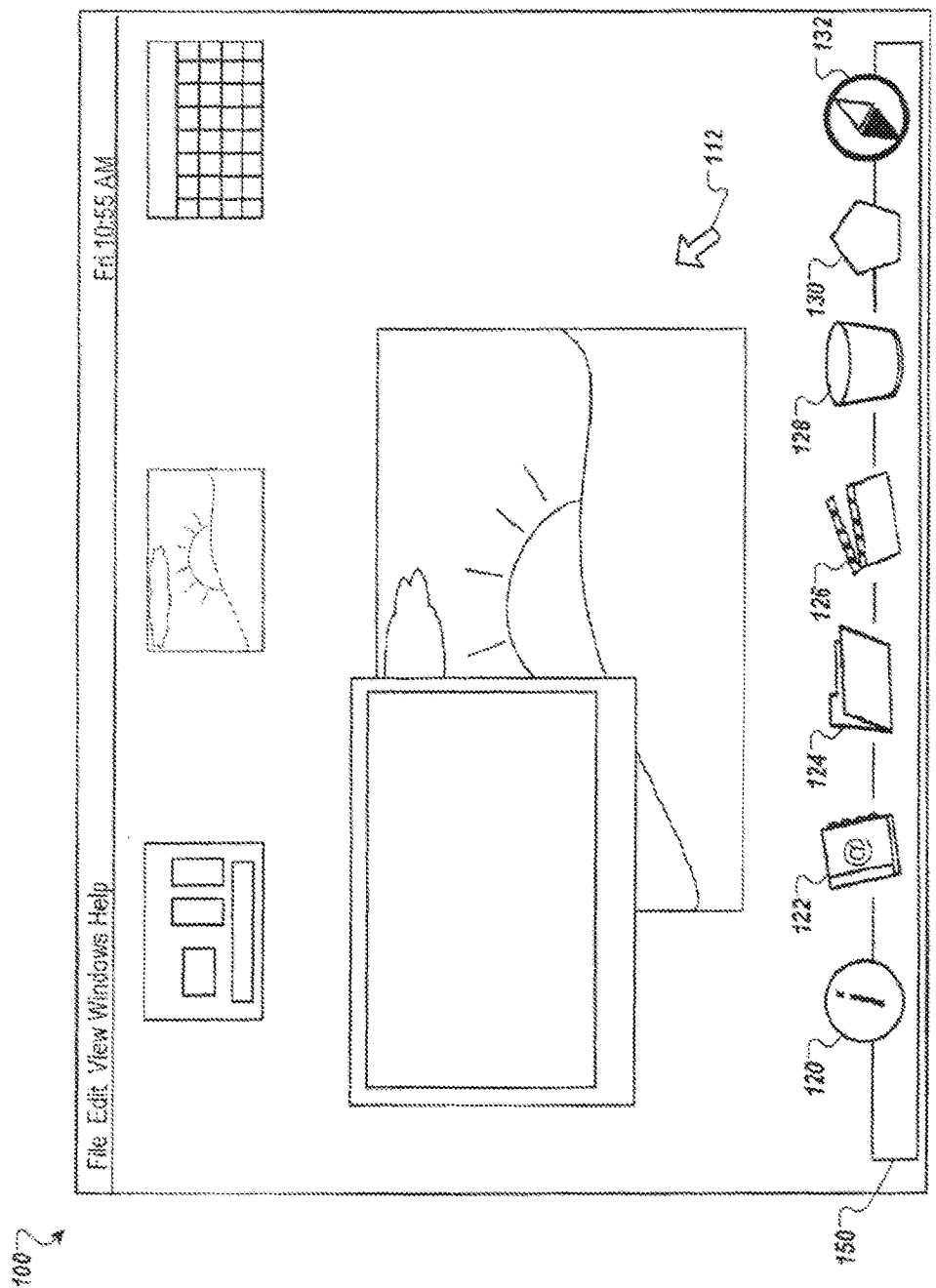
FIG. 1 illustrates an exemplary user interface showing a desktop environment with a dock.

Exemplary User Interfaces for Presenting Visual Indicators of Hidden Objects in a User Interface FIG. 1 illustrates an exemplary user interface 100, which can be a desktop of an operating system. The user interface 100 can include a docking element 150, or dock, which provides an area where commonly used or preferred applications can be easily accessed through selection of icons included in the docking element 150, each icon associated with a different application. The dock 150 can be located in any region of the user interface, although in some instances, the dock 150 is presented at the edge of the visible area of a user interface, such as at the bottom of the screen as depicted in FIG. 1. The location of the dock 150 can also be changed based on user preferences or automatically in response to the context in which the dock 150 is presented.

In the illustrated example, icons (120, 122, 124, 126, 128, 130, 132) are generated for display in the dock 150, and each icon corresponds to a shortcut to a particular application. The icons in the dock can be moved around, rear ranged, deleted, modified, and recreated. Various features can be included with the dock 150 to facilitate user navigation of icons contained in the dock or to enhance the utility and presentation of the dock 150. For example, in some implementations, the icons in the dock 150 can be visually altered based on movement and/or location of the pointer 112. As the pointer 112 hovers over a particular icon, for example, the icon can be enlarged, brightened, animated, or visually enhanced with respect to the other icons in the dock 150 to indicate to the user which icon would be selected if the user enters an appropriate input. Further, when multiple icons are contained in the dock 150, the dock 150 may not have space to display each icon. As the pointer 112 moves across the icons presented in the dock 150, the icons can shift to the left or right as necessary to create the effect of scrolling through the available icons in the dock 150.

In some instances, the dock 150 can be automatically hidden from view when the user is not accessing items in the dock 150 and redisplayed when the user chooses to access the dock 150 again. The dock 150 can be hidden from view based on the location of the pointer 112 relative to the dock 150. In some implementations, if the pointer 112 moves beyond a certain point away from the dock 150, the dock 150 is automatically removed from the visible area of the user interface. The movement of the pointer 112 back within the edge of the screen where the dock 150 was previously located can trigger redisplaying the dock 150 again. Certain animations can also be associated with each action involving the dock 150. As the dock 150 is temporarily hidden from view, for example, the animation can include several frames depicting the dock 150 sliding or shifting off the visible area of the user interface. A similar animation can be shown as the dock 150 reappears in the user interface. The automatic hiding and displaying of the dock 150, however, can in certain instances interfere with the user's interactions with the desktop environment. For example, the user may need to access a graphical object within the region that was previously occupied by the dock 150. Movement of the mouse in the particular region, however, can trigger the dock 150 to reappear in the user interface and interfere with the user's original intention. Accordingly, various indicators can be presented to a user to delay the full display of a hidden dock 150 and inform the user of the action(s) required to display the dock 150 or to keep the dock 150 hidden according to the user's needs.

Exemplary Actions for Triggering Indicators of Hidden Objects

Figure 2A:
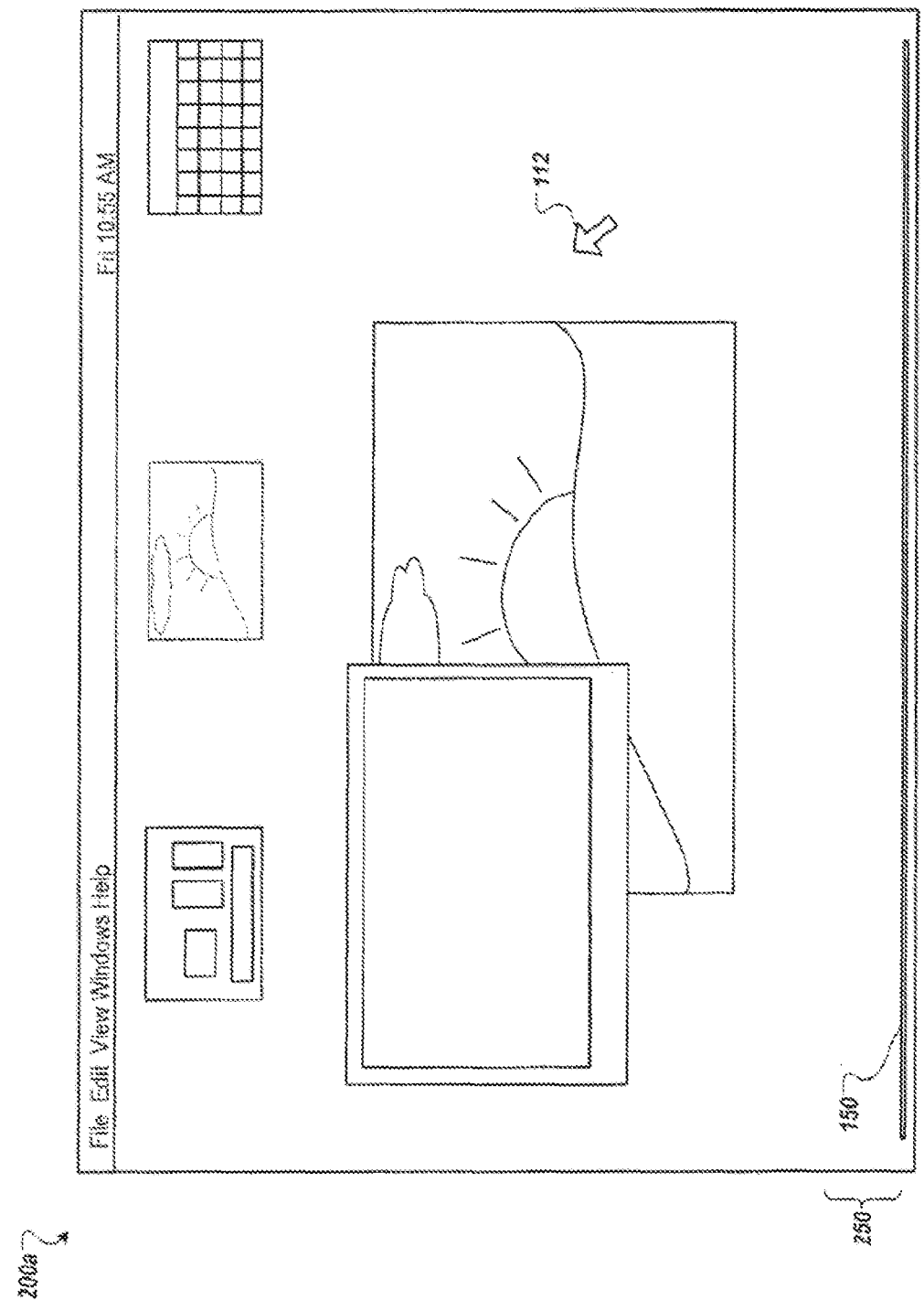
FIG. 2A illustrates an exemplary user interface showing removal of the dock from view.

FIGS. 2A-D depict example screenshots 200*a*, 200*b*, 200*c*, and 200*d* of actions performed that can trigger indicators of hidden objects. For example, as illustrated in FIG. 2A, the dock 150 can be initially hidden from view. In the illustrated example, the dock's 150 default position is to be hidden from view if the user is not currently accessing the dock 150. In some implementations, whether the dock 150 is displayed at a given moment can be based on both the location of the pointer 112 as well as the time elapsed since the pointer 112 was last located within the vicinity of the dock 150. Other settings can also be used to configure the dock's automatic functions and positioning, such as automatically hiding the dock 150 based on the context of a current application. When the pointer 112 is moved near the bottom of the screen, the presence of the pointer 112 within the region can trigger the dock 150 to emerge. In particular, a region 250 can be defined such that the display of the dock 150 is triggered when the pointer 112 is moved within the region 250. The temporary removal of the dock 150 when the dock 150 is not presently used can free up desktop space for other applications until the dock 150 is needed again.

As described above, however, the dock 150 may reappear in the user interface unexpectedly when the user accidentally moves the pointer 112 into region 250 or when the user intends to access an object in the region 250 other than the dock 150. Accordingly, as described below with respect to FIG. 2B, an intermediary action can be triggered when the pointer 112 enters the region 250 before the dock 150 is fully displayed in the user interface. The intermediary action can delay the display of the dock 150 or warn the user that further actions by the user could trigger display of the dock 150. In some instances, the intermediary action can be a visual indicator informing the user that the pointer 112 is in a location that could trigger display of the dock 150 based on further input from the user. The visual indicator can include various types of signals, including visual cues to the user suggesting the next action that would trigger display of the dock 150.

Figure 2B:
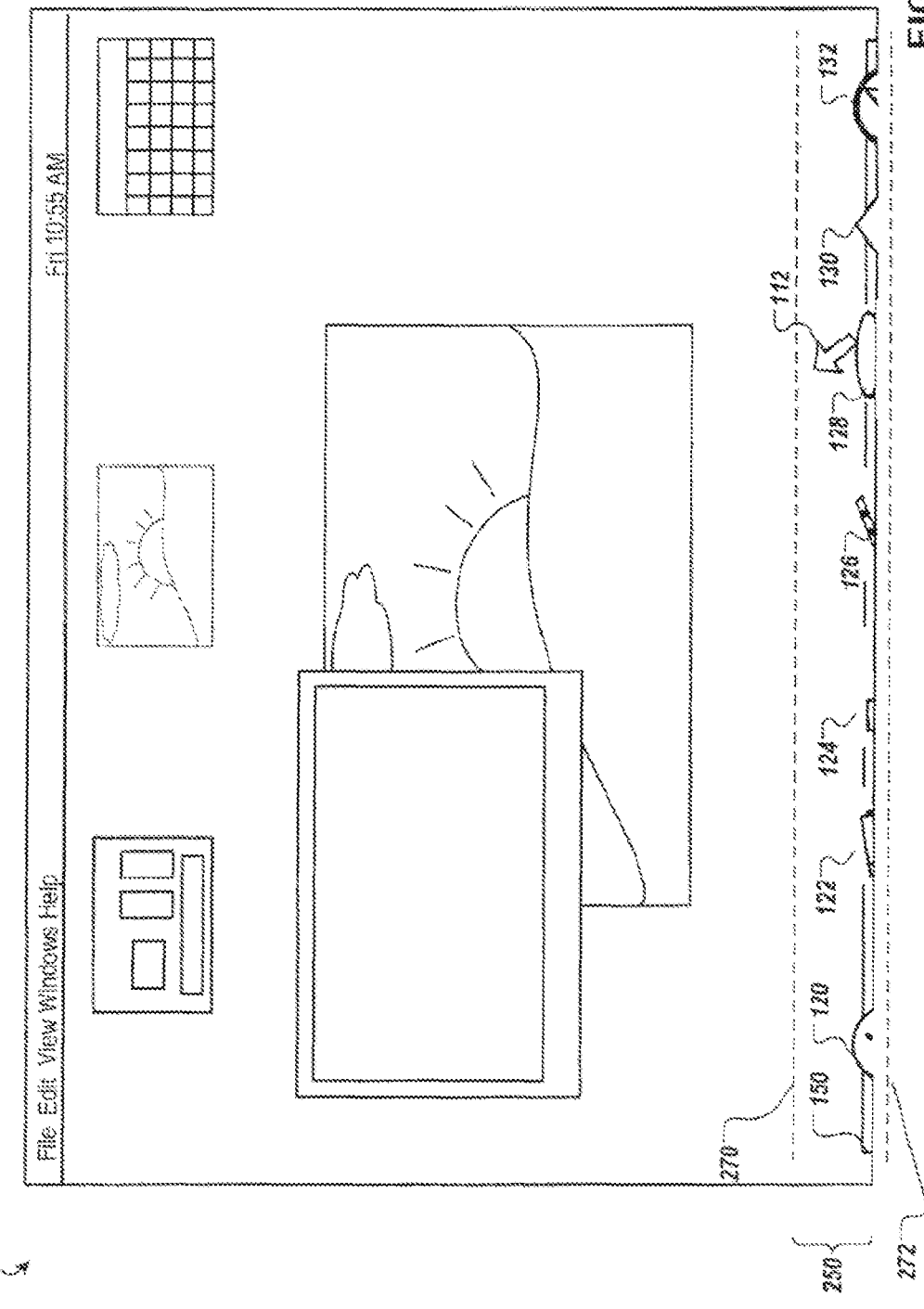
FIG. 2B illustrates an exemplary user interface showing partial display of the dock in response to a pointer crossing a virtual boundary.

FIG. 2B illustrates a screenshot 200*b* of an intermediate action associated with the dock 150 triggered by movement of the pointer across a first virtual boundary 270. In FIG. 2B, the virtual boundary 270 corresponds to an edge of the region 250, but the virtual boundary 270 can include any virtual boundary at any suitable location in the user interface. For example, in some instances, the virtual boundary 270 can be located at or beyond the edge of the visible area of the user interface (e.g., virtual boundary 272) such that the pointer 112 needs to move outside of the visible area in order to trigger further actions. Further, although the virtual boundary 270 is depicted in FIG. 2B as a "virtual" boundary that may not be visible to the user, the virtual boundary 270 can also be visibly displayed in the user interface in some implementations. Still further, the virtual boundary can be a straight line or some other shape, such as a shape sufficient to circumscribe a particular region in the user interface. In some implementations, the virtual boundary can also consist of an amorphous shape adaptable to correspond to the shape of a particular graphical object or region. The shape, form, or distance covered by the virtual boundary can also be dynamically modified, either manually or automatically, based on the particular context associated with a particular operating system, application, scenario, or user.

In certain implementations, the intermediate action can be a partial display of the dock 150. As the pointer 112 crosses the first virtual boundary 270 into region 250, an upper portion of the dock 150 can be displayed and maintained in a fixed position until the pointer 112 is moved back above the first virtual boundary 270 again or until the pointer 112 moves across other virtual boundaries that trigger full display of the dock 150. In addition to or instead of partial display of the dock 150, other intermediate actions can also be triggered when the pointer 112 crosses the first virtual boundary 270, as will be described below.

The intermediate action illustrated in FIG. 2B can provide a visual cue to the user that the dock 150 is located at the bottom of the screen, and that movement of the pointer 112 into region 250 can potentially trigger full display of the dock 150. Further, the intermediate action allows the user to decide whether to pursue actions that will subsequently trigger full display of the dock 150 or to withdraw the pointer 112 from the region 250 (or keep the pointer 112 within region 250) to prevent the dock 150 from being fully displayed. After triggering of the intermediate action, the dock 150 can be fully displayed in response to additional input from the user. For example, a second virtual boundary 272 can be defined such that if the pointer 112 crosses the second virtual boundary 272, the dock 150 will be fully displayed. In some implementations, partial display of the dock 150 is not triggered until the pointer 112 moves across a virtual boundary beyond the visible area of the screen, such as virtual boundary 272. In this instance, full display of the dock 150 is triggered after the pointer 112 moves still further beyond the visible area of the screen, such as across virtual boundary 274 as illustrated in FIG. 2C.

Figure 2C:
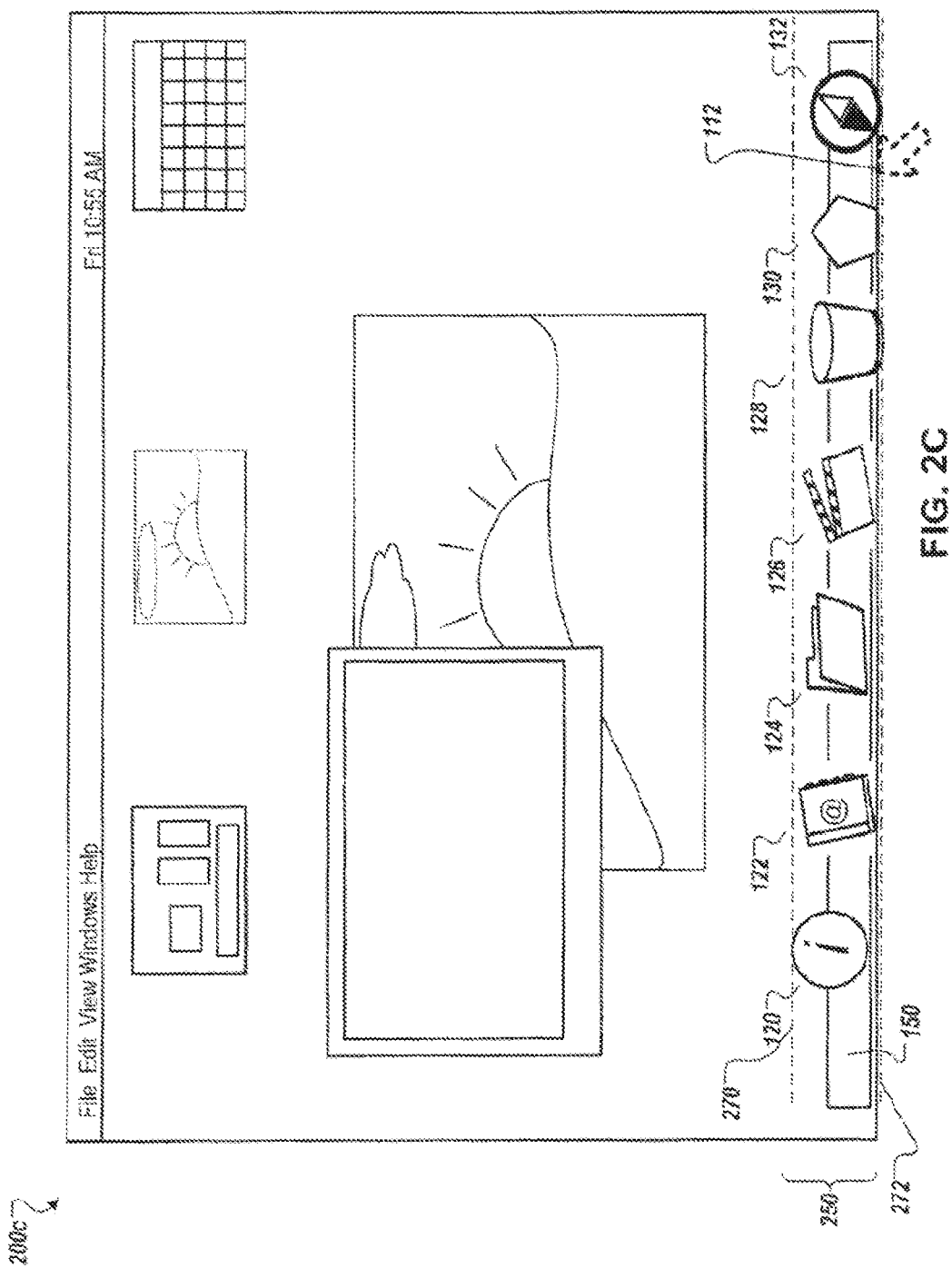
FIG. 2C illustrates an exemplary user interface showing full display of the dock in response to a pointer crossing a second virtual boundary.

FIG. 2C illustrates an example screenshot 200*c* of generating for display the dock 150 in response to a pointer 112 crossing a second virtual boundary 272. In the illustrated example, the dock 250 is located at the bottom of the screen. Accordingly, the second virtual boundary 272 can be located below the first virtual boundary 270 to provide a natural progression for the user when moving the pointer 112 toward the bottom of the screen. After the user crosses the first virtual boundary 270 with the pointer 112 and the dock 150 is partially displayed, the user can then move the pointer 112 further in the same general direction across the second virtual boundary 272 to trigger display of the dock 150. Here, the second virtual boundary 272 is located at the edge of the screen so that the user needs to move the pointer 112 outside of the visible area of the screen to trigger display of the dock 150. If the pointer 112 is moved back above the first virtual boundary 270, the dock 150 may be hidden from view again.

Figure 2D:
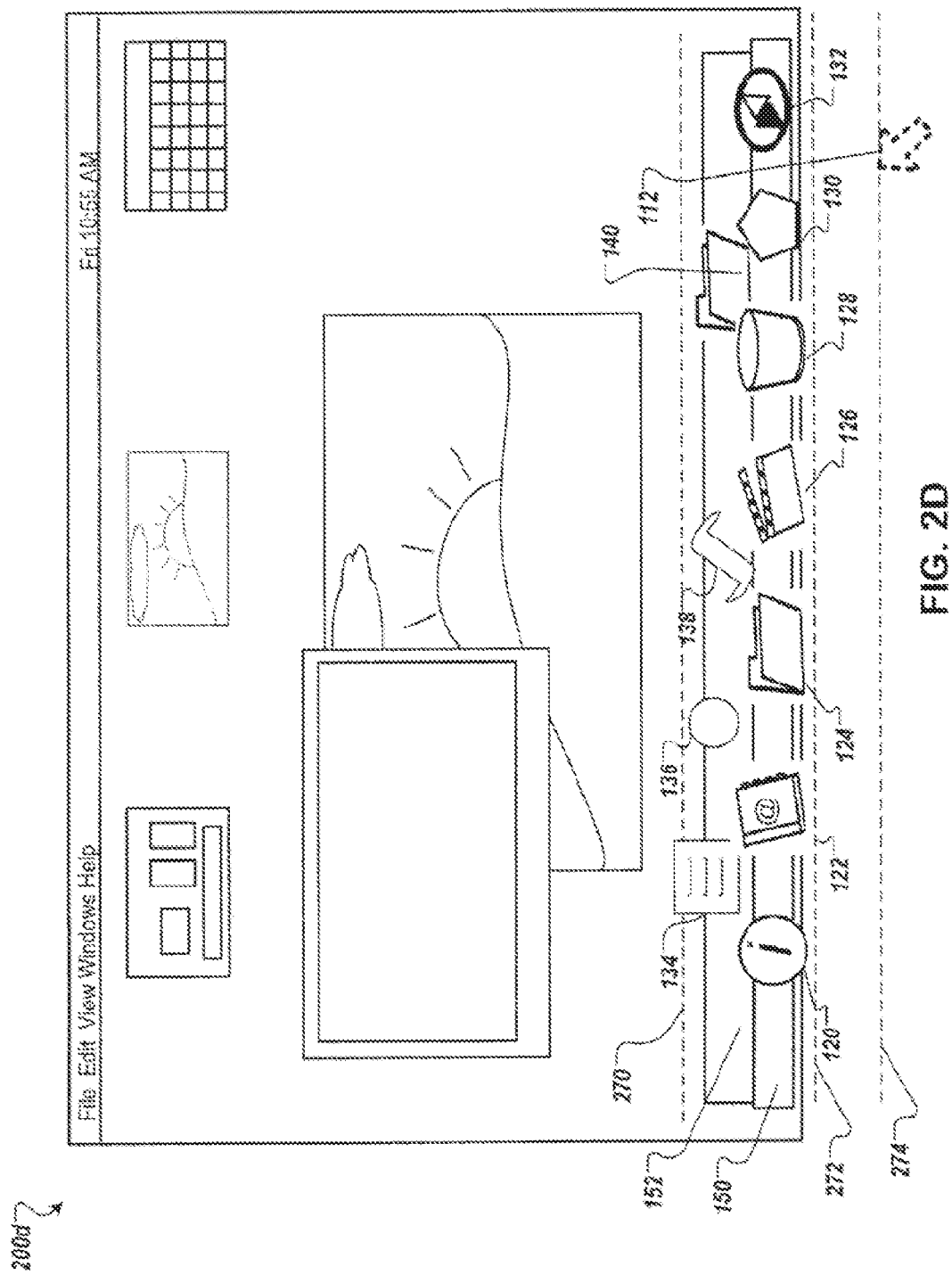
FIG. 2D illustrates an exemplary user interface showing display of a second layer of the dock in response to a pointer crossing a third virtual boundary.

The use of virtual boundaries can be extended to include additional features for presenting objects in the user interface. FIG. 2D illustrates an example screenshot 200*d* of an additional action triggered by the pointer 112 crossing a third virtual boundary 274. In some implementations, multiple instances or layers of the dock 150 can be presented in the user interface. For example, a second layer 152 of the dock can be generated for display above the dock 150, allowing additional icons (134, 136, 138, 140) to be presented to the user for further navigation. In the present example, the second layer 152 remains hidden until the user moves the pointer 112 across a third virtual boundary 274.

In some instances, the third virtual boundary 274 can also be located outside of the visible area of the user interface, and the user may need to enter an input to "move" the pointer 112 off the screen a certain distance before crossing the third virtual boundary 274 even though movement of the pointer 112 is no longer displayed in the user interface. Further, although FIG. 2D illustrates two layers of docks and a number of virtual boundaries for triggering display of the layers, additional virtual boundaries can be used to trigger displays of more than two dock layers. In some implementations, different docks associated with different applications or operating systems can be displayed in a layered format as depicted in FIG. 2D. For example, an application-specific dock can be displayed in the top layer while an operating system dock can be displayed in the bottom layer in response to movement of the pointer across different virtual boundaries.

Exemplary Actions for Toggling Between Hidden Objects

Figure 3B:
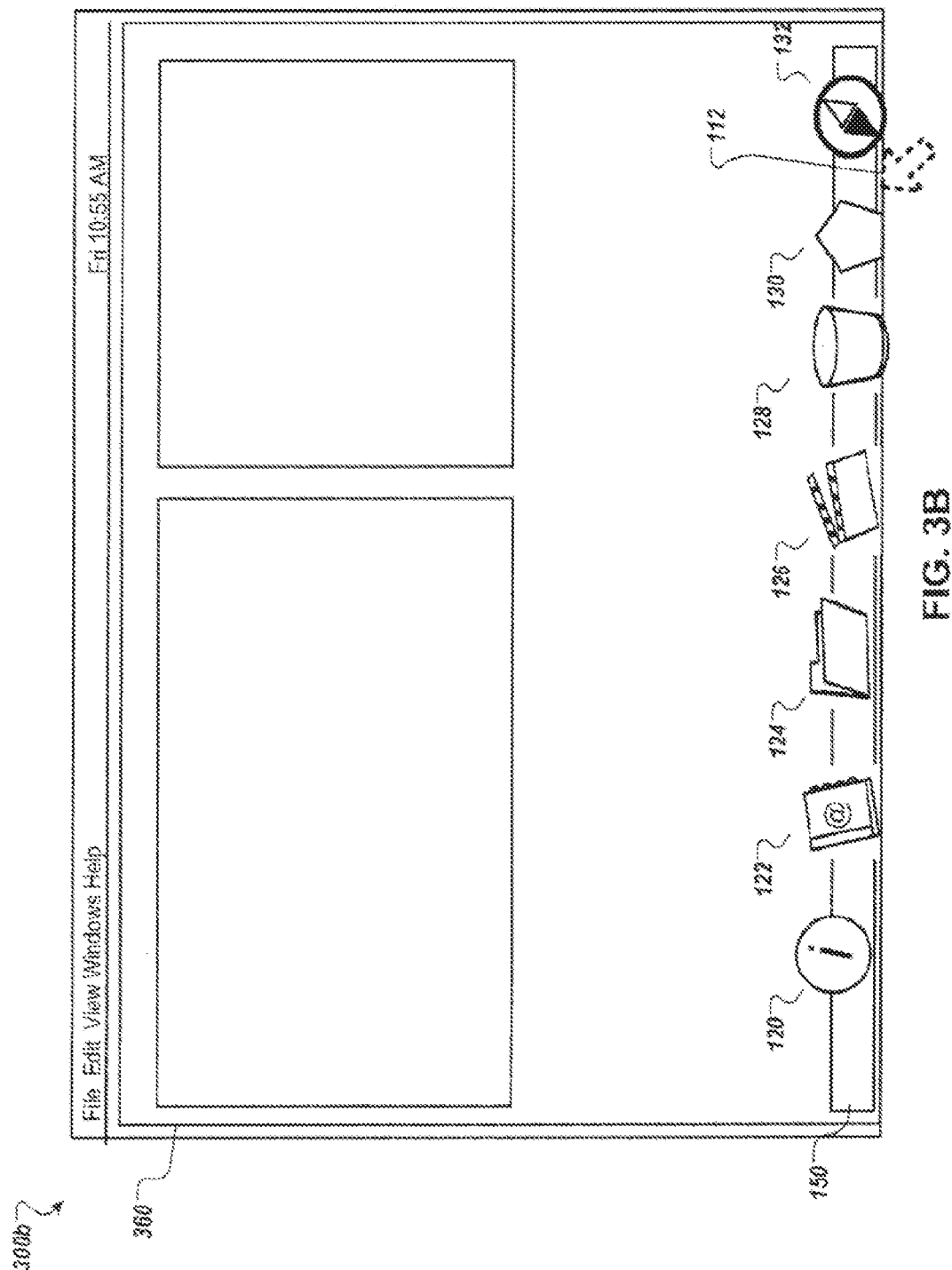

FIGS. 3A-B depict example actions for triggering indicators for switching between hidden objects. As described above in connection with FIG. 1, the triggering of different actions associated with hidden objects based on a pointer 112 crossing a virtual boundary can be applied in different scenarios. For example, a virtual boundary can be used to trigger toggling between different graphical objects. Turning to the illustrated example, FIG. 3A illustrates an example screenshot 300a of an application-specific dock 350 presented in a user interface. As seen in FIG. 3A, the first dock 350 is a dock with icons 334, 336, 338, and 340. In some implementations, an application can be associated with its own dock, toolbar, or menus independent of the dock associated with the operating system. For example, an application that is currently running can generate for display a specific dock with shortcuts to features, windows, and other functionality specific to the application. The dock associated with the application can be different than a dock associated with the operating system that presents icons representing different applications.

In FIG. 3A, a particular application 360 can be opened for the user. The dock 350 associated with the application 360 can be displayed or hidden from view using automated features similar to those described above in connection with FIGS. 2A-D. For example, the dock 350 can be hidden from view by default, but user movement of the pointer 112 across certain virtual boundaries can trigger display of the dock 350. For example, in FIG. 3A, movement of the mouse 112 below the visible area of the screen can trigger display of the dock 350. In certain instances, the user of application 360 may want to switch from the application-specific dock 350 to the operating system dock 150 as illustrated in FIG. 3B.

FIG. 3B illustrates an example screenshot 300b of an operating system dock 150 presented in a user interface while the application-specific dock 350 of an open application 360 is hidden from view. As FIG. 3B illustrates, the user can toggle between two different docks based on the user's actions with respect to the pointer 112 and virtual boundaries defined in the user interface. A number of different user actions for toggling between docks are within the scope of the present disclosure. For example, each successive crossing of a virtual boundary can trigger toggling of the dock presented to the user. In some implementations, the user can move the pointer 112 across a virtual boundary a first time, triggering display of one of the docks (e.g., the application-specific dock 350 as illustrated in FIG. 3A). The user may move the pointer 112 back across the virtual boundary to make a selection within the desktop area or to perform other actions with the pointer 112. If the user once again moves the pointer 112 down across the virtual boundary, the operating system dock 150 may then be presented to the user while the application-specific dock 350 is hidden from view. Accordingly, the user can toggle between different docks using successive traversals of the virtual boundary by the pointer 112.

Further, other actions can be used to trigger toggling between different visual objects. Example actions that can be used to trigger toggling between docks can include maintaining the position of the pointer 112 for at least a predefined amount of time to trigger a switch in the dock, performing a particular gesture pattern with the pointer 112, performing a quick gesture with the pointer 112, or other actions using the pointer 112.

Exemplary Indicators of Hidden Objects

Figure 4:
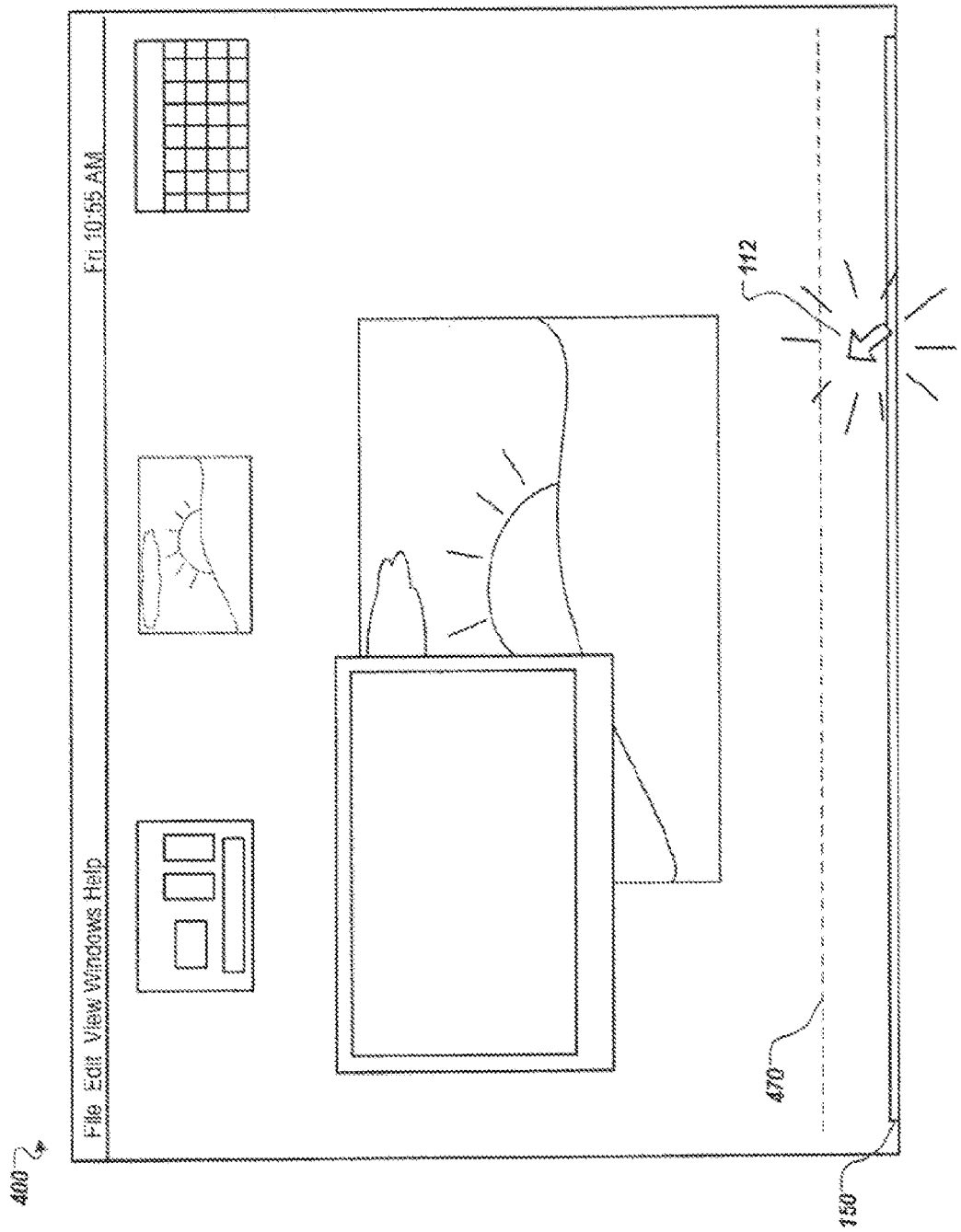
FIG. 4 illustrates an exemplary user interface showing a visual indicator provided in response to a pointer moving across a virtual boundary.

FIG. 4 illustrates another example of a visual indicator presented to inform a user that a hidden object can be revealed in the user interface and allow the user to decide whether to continue with displaying the hidden object. In some implementations, providing the visual indicator includes altering the appearance of visual objects in the user interface after the pointer 112 crosses a threshold. In FIG. 4, as the pointer 112 crosses a virtual boundary 470, the pointer 112 can be visually enhanced by displaying a glowing effect with the pointer 112. The glowing effect displayed with the pointer 112 can be a visual cue to the user that the pointer 112 has reached an area of the user interface that is near a hidden object. In some instances, instead of or in addition to presenting a glowing pointer 112, a number of pixels surrounding the virtual boundary 470 or area where the dock 150 is hidden at the edge of the screen can be highlighted to produce a glowing effect suggesting that an object is hidden from view in that area.

Further, the pointer 112 can be visually altered in other ways as the pointer 112 crosses a threshold. In some instances, the pointer 112 can be visually enlarged or compressed after the pointer 112 has entered a region in the vicinity of the dock. Still further, the visual appearance of the pointer 112 can be dynamically modified based on movement of the pointer 112 through the region below the virtual boundary 470. As the pointer 112 moves into the region below virtual boundary 470, the visual depiction of the pointer 112 can be altered to simulate different effects. For example, as the pointer 112 moves across the virtual boundary 470, the animation of the pointer 112 can include simulating the movement of the pointer 112 over a virtual object, similar to a "speed bump." In this instance, the visual image of the pointer 112 can be magnified temporarily and then de-magnified as the pointer 112 crosses the virtual boundary 470.

Still further, in some implementations, the virtual boundary 470 can be located at or below an edge of the visible area of the user interface. The dock 150 can be generated for display in response to movement of a pointer 112 beyond the visible area of the user interface as the pointer 112 crosses the virtual boundary 470. In certain implementations, the presentation of the previously hidden dock 150 as the pointer 112 crosses a virtual boundary can include displaying a shift of the entire user interface such that the dock 150 is shifted along with the user interface into view. For example, if the dock 150 is hidden beyond the bottom edge of the user interface, the displayed animation can simulate the scrolling of the entire desktop environment upward as the pointer 112 crosses a virtual boundary 470. The dock 150 is then shifted upward into view as well.

FIGS. 2A-D and FIG. 4 illustrate examples of visual indicators that can be triggered based on user inputs before displaying a hidden object. Other forms of indicators can also be used. For example, the velocity of a pointer's movement can be reduced as the pointer 112 crosses a first virtual boundary. In particular, the user may input a level of velocity for moving the pointer 112 across a virtual boundary. As the pointer 112 crosses the virtual boundary, however, the visual display of the movement of the pointer 112 can be automatically slowed or stopped completely despite a constant input for movement of the pointer 112 of a particular velocity from the user. Accordingly, the effect of "resistance" on the pointer 112 can be achieved by slowing down the velocity of the pointer 112 relative to the input velocity. In some instances, the effect can be analogous to a virtual "wall" which halts movement of the pointer 112 beyond a certain threshold. The resistance or wall felt by the user provides notice to the user that a hidden object can potentially be displayed and that further action is required in order to display the hidden object.

In certain instances, the user may be required to continue moving the cursor in one direction until the "resistance" is broken, as if going through a wall, or the user may need to perform quicker gestures using the pointer 112 before the hidden object is released. Other types of actions that can be required to trigger full display of a hidden object can include repeated movement patterns of the pointer 112 within the vicinity of the hidden object, maintaining the pointer 112 within a certain region for a minimum amount of time, or other actions involving the user's movement of the pointer 112 in a particular manner.

Exemplary Actions for Triggering Appearance of Hidden Objects in a Window

Figure 5A:
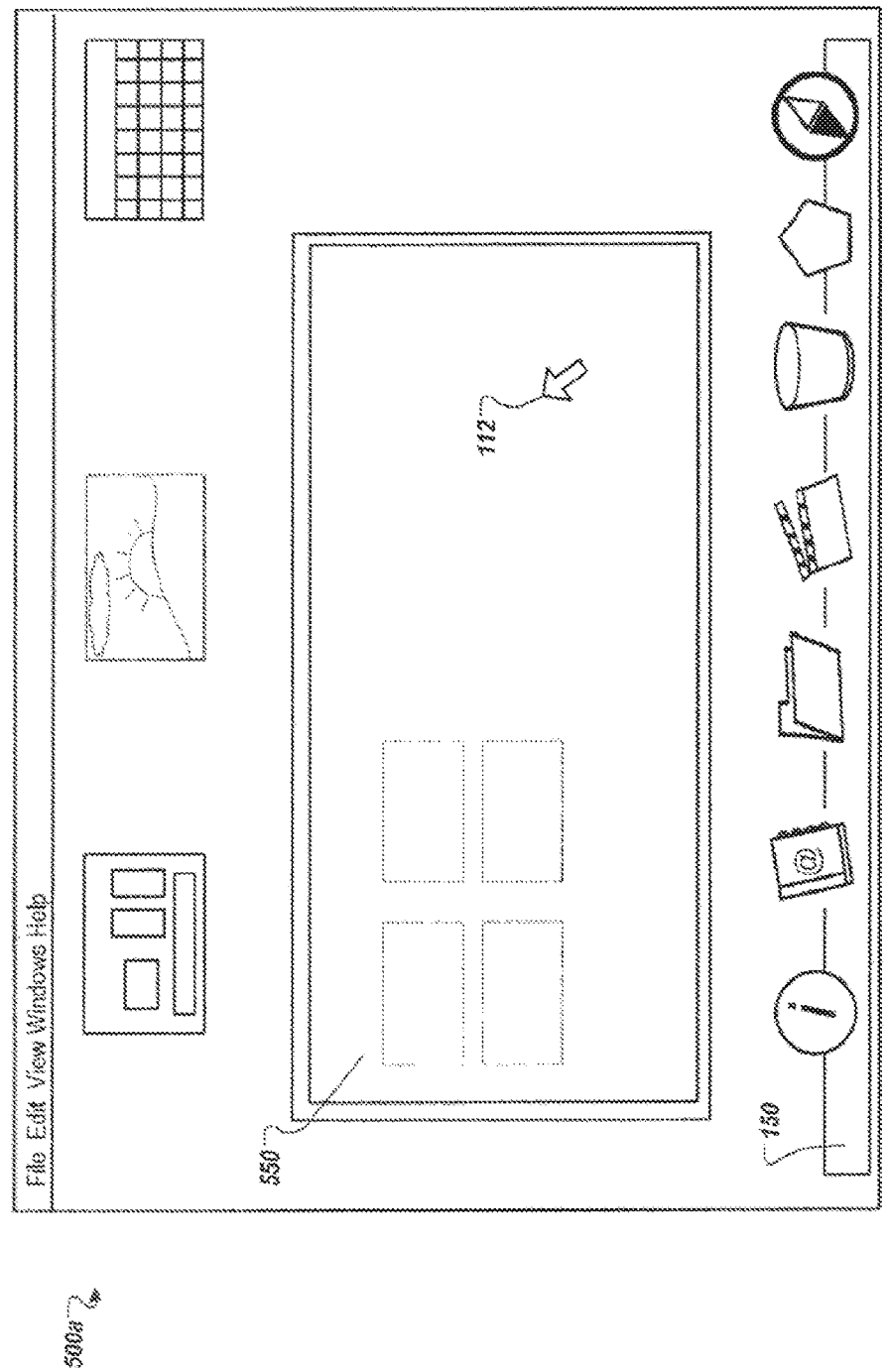
FIGS. 5A-5C illustrate an exemplary user interface showing display of a widget at the boundary of an application window in response to user input.
Figure 5B:
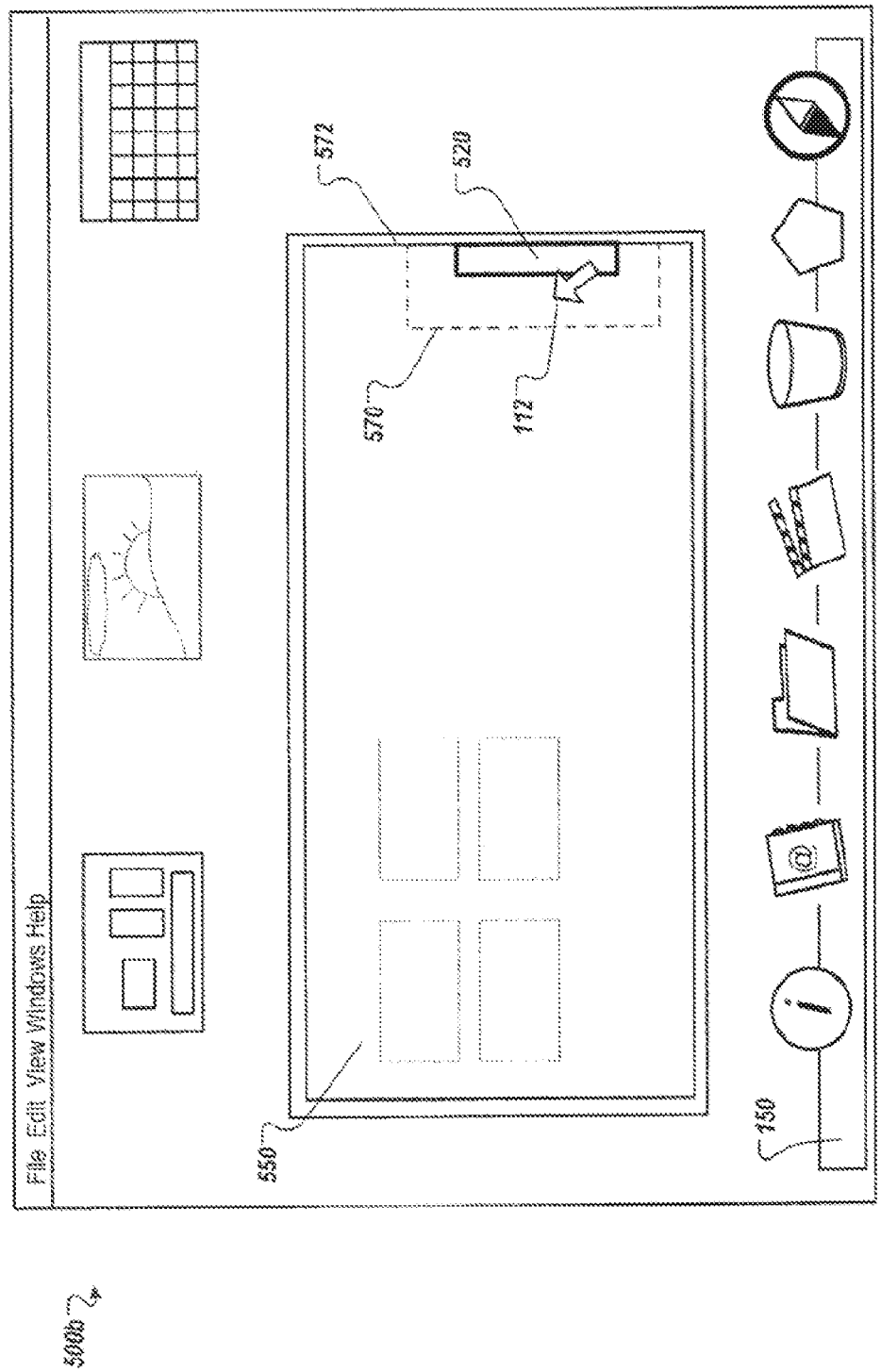
Figure 5C:
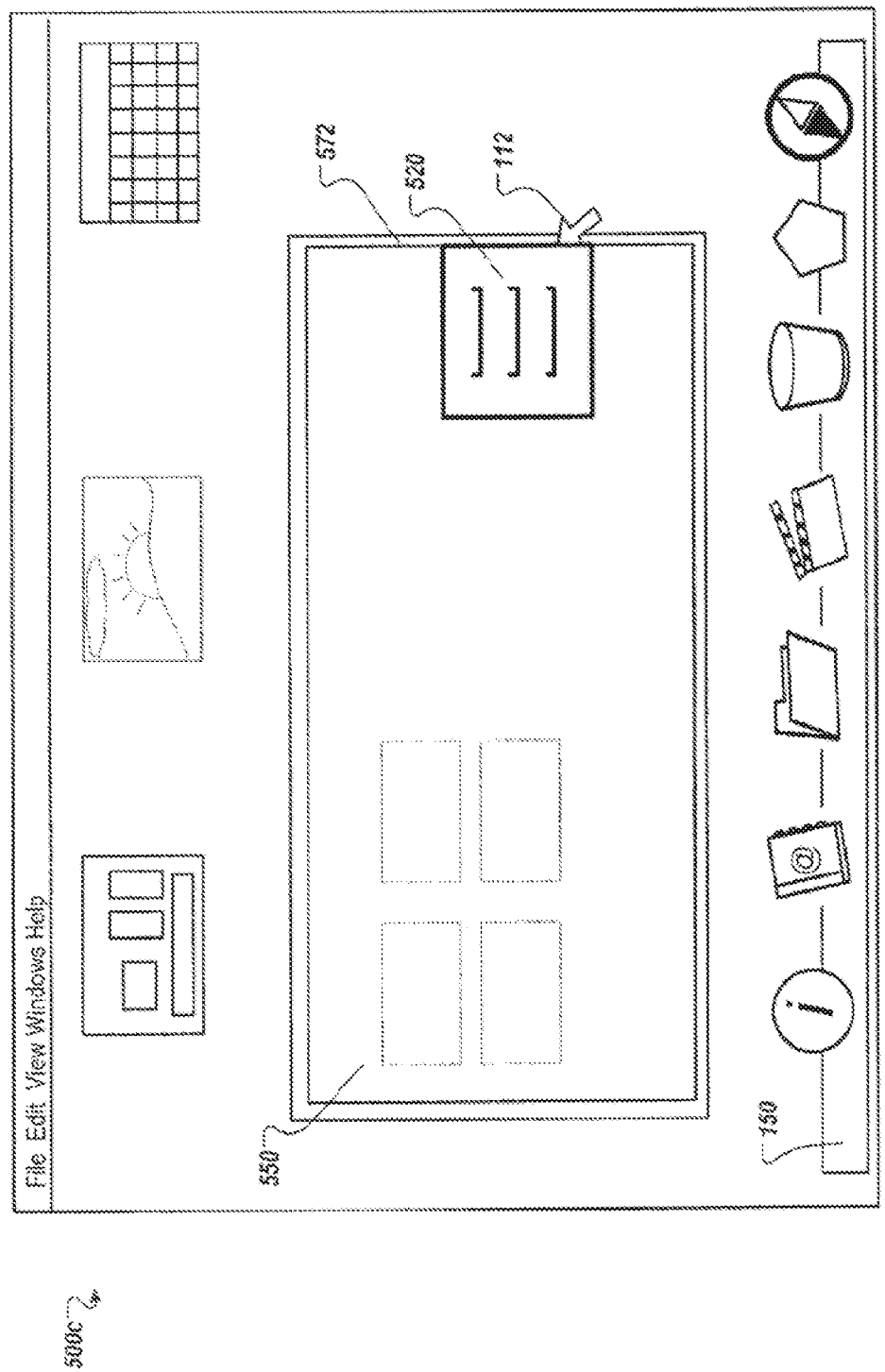

Although the various methods for triggering actions based on movement of a pointer described above generally relate to the hiding and display of a dock, any of the methods can be applied to other types of graphical objects as well. Any graphical or logical boundary in a user interface can provide the basis for defining virtual boundaries that trigger actions associated with hidden objects when an appropriate input is received from a user. For example, virtual boundaries can be defined in relation to application window edges or virtual/remote desktop screens. FIGS. 5A-C illustrate example screenshots 500a, 500b, and 500c that depict actions associated with displaying a widget 520 at a boundary 572 formed by the edge of an application window 550. As seen in FIG. 5A, a desktop environment is presented in a user interface, the desktop environment including various components associated with the operating system, such as a dashboard 104, workspace 106, calendar 108, and dock 150. Further, a current application may be running, and an application window 550 is open as an interface to allow a user to access objects and features associated with the application. The user can perform tasks in the user interface and in the application window 550 using a pointer 112.

In some implementations, the application can include features such as graphical objects, menus, widgets, or other items that are accessible to a user. The items in the application can be hidden from view in certain instances to conserve the area in the application window 550 for other uses. The user may need access to the hidden objects in some situations, however. A visual indicator can be provided to facilitate display of the hidden objects based on the user's input. For example, FIG. 5B illustrates an intermediate action performed in response to movement of a pointer 112 across a visual boundary 570. In FIG. 5B, the widget 520 is initially hidden from view. When the widget 520 is fully displayed in the application window 550, however, it can be displayed in the vicinity of a particular edge 572 of the application window 550. Accordingly, a virtual boundary 570 can be defined surrounding the region in which the widget 520 is typically displayed.

As the user moves the pointer 112 toward the region, the pointer 112 may cross the virtual boundary 570, triggering an intermediate action in the user interface. In the illustrated example, the intermediate action consists of generating for display a portion of the widget 520 in the application window 550. In some instances, as long as the pointer 112 remains within the region encompassed by the virtual boundary 570, the widget 520 remains partially displayed as depicted in FIG. 5B. The partial display of the widget 520 can provide an indication to the user that a widget 520 is available in the vicinity of the pointer 112. Further, in some instances, the left edge of the widget 520 is partially displayed to provide an impression that the widget 520 is hidden beyond the edge 572 of the application window 550. On the one hand, the partial display of the widget 520 can notify the user that the widget 520 will occupy a portion of the application window 550 in the vicinity of the application window edge 572 if further action is taken. On the other hand, the partial display of the widget 520 can suggest to a user a further action that can be performed by the user in order to trigger full display of the widget 520. For example, further movement of the pointer 112 toward the application window edge 572 can trigger full display of the widget 520 as depicted in FIG. 5C. Accordingly, the user can decide to continue with movement of the pointer 112 toward the application window edge 572 to trigger display of the widget 520 or to avoid movement of the pointer 112 toward the application window edge 572 to prevent display of the widget 520.

In some implementations, the intermediate action can consist of other actions performed m response to a pointer 112 crossing the virtual boundary 570. For example, movement of the pointer 112 can be slowed or hindered as the pointer 112 crosses the virtual boundary 570 to provide the impression that the pointer 112 is encountering "resistance" in the user interface that prevents the pointer 112 from immediately crossing the application window edge 572, which may trigger further actions. In order to move the pointer 112 beyond the area of "resistance," the user may need to input additional movement of the pointer 112 sufficient to cross the area of resistance.

FIG. 5C illustrates an example screenshot 500c of full display of a previously hidden widget 520 in response to movement of a pointer 112 across an application window edge 572. As seen in FIG. 5C, the user can trigger full display of the widget 520 by moving the pointer 112 across a second virtual boundary. Here, the edge 572 of the application window 550 can serve as the second virtual boundary. In some implementations, an animation can be associated with displaying the widget 520, such as a sliding motion of the widget 520 out from "behind" the application window edge 572. Further, in certain implementations, the widget 520 is partially displayed only when the pointer 112 crosses the application window edge 572 (in contrast to virtual boundary 570 as described above in connection with FIG. 5B) and fully displayed after the pointer 112 moves beyond another virtual boundary beyond the edge of the application window.

Exemplary Processes for Triggering Actions in Response to User Inputs

Figure 6:
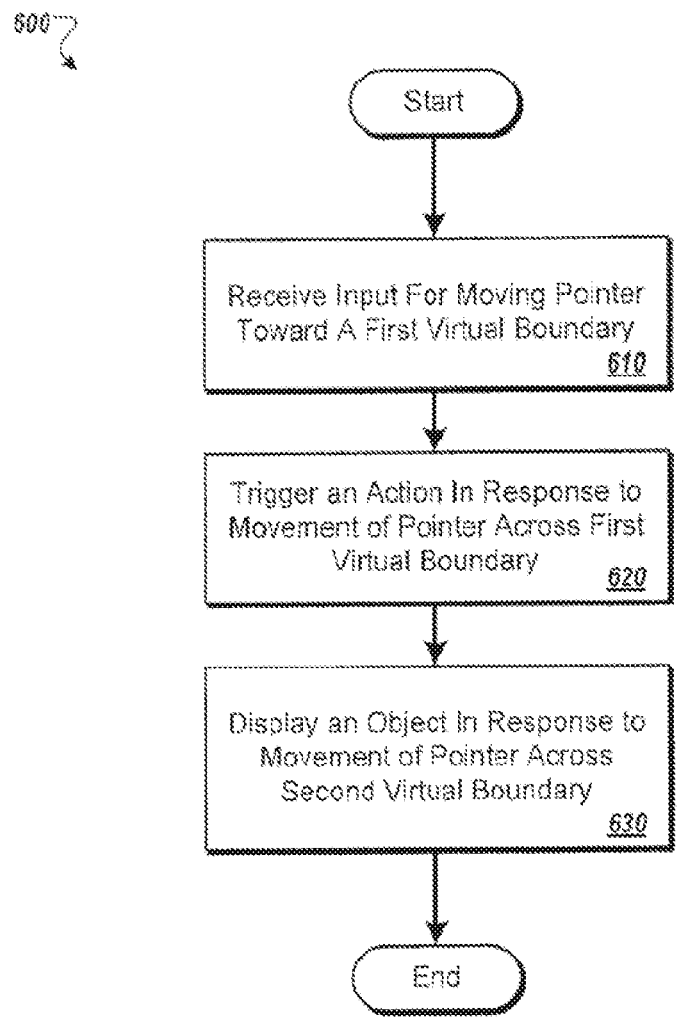
FIG. 6 is a flow diagram of an exemplary process for triggering actions in response to movement of a pointer across virtual boundaries.

FIG. 6 is a flow diagram of an exemplary process 600 for triggering actions in a user interface in response to movement of a pointer across virtual boundaries. In the exemplary process 600, an input is received for moving a pointer toward a first virtual boundary in the user interface (610). The pointer can be a tool presented in the user interface to allow a user to perform actions associated with graphical objects displayed in the user interface. Movement of the pointer toward the first virtual boundary can be animated in the user interface. As the pointer moves across the first virtual boundary, an action is triggered (620). The action can include, for example, partial display of an object hidden from view, altering the appearance of the pointer or other graphical objects in the user interface, a change in the velocity of movement of the pointer, applying a visual glow to particular objects in the user interface, or other actions. As the pointer moves across a second virtual boundary, an object is displayed in response to movement of the pointer across the second virtual boundary (630). Displaying the object can include, for example, full display of an object previously hidden from view or replacing an object currently presented in the user interface with a different object previously hidden from view.

Figure 7:
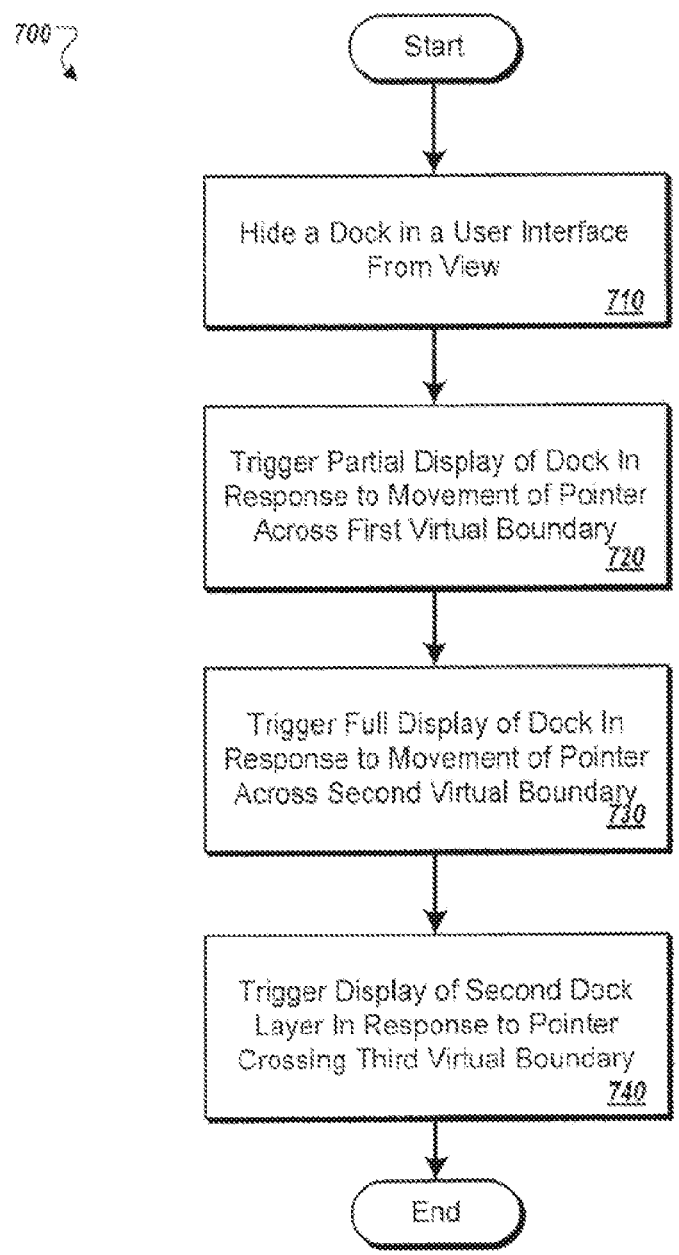
FIG. 7 is a flow diagram of an exemplary process for displaying multiple dock layers in response to movement of a pointer across virtual boundaries.

FIG. 7 is a flow diagram of an exemplary process 700 for displaying a dock in a user interface in response to movement of a pointer across virtual boundaries. A dock in a user interface is hidden from view (710). The user can perform an input for moving a pointer across a first virtual boundary. The dock is partially displayed in response to movement of the pointer across the first virtual boundary (720). If the user moves the pointer across a second virtual boundary, the dock is fully displayed (730).

Figure 8:
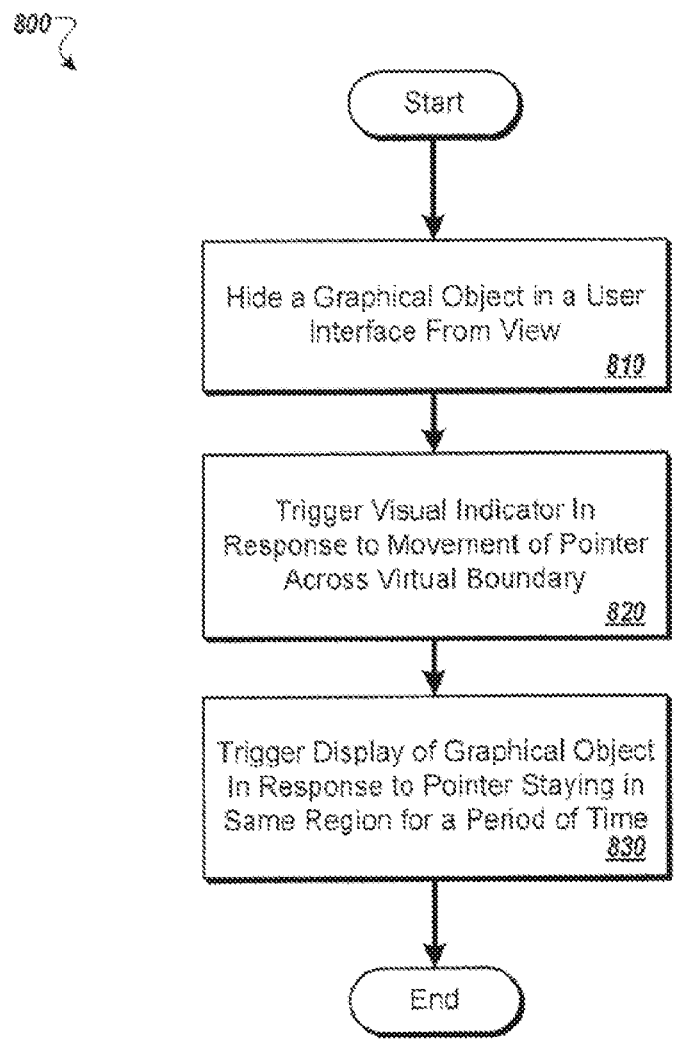
FIG. 8 is a flow diagram of an exemplary process for displaying a dock in response to maintaining the pointer in the same region for a period of time.

FIG. 8 is a flow diagram of an exemplary process 800 for providing a visual indicator before displaying a graphical object in response to a pointer remaining in a region for a period of time. A graphical object in a user interface is hidden from view (810). A visual indicator is triggered in response to movement of the pointer across a virtual boundary (820). The visual indicator can be a visual cue to the user that a hidden object can be displayed in a particular region or a suggestion that a specific action can be performed to trigger display of the hidden object. Examples of visual indicators can include altering the appearance of graphical objects in the user interface or displaying a portion of the hidden object. Display of the graphical object can be triggered in response to the pointer remaining within the same region for a period of time (830).

Figure 9:
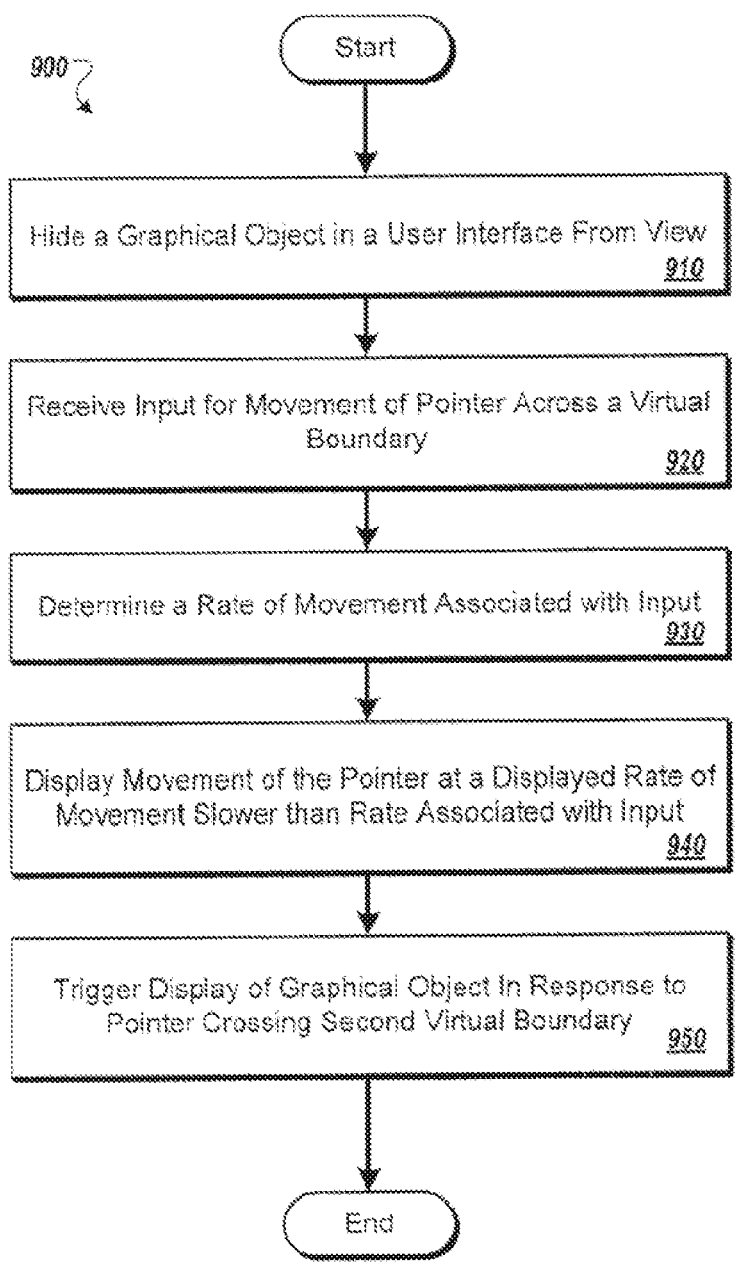
FIG. 9 is a flow diagram of an exemplary process for decreasing velocity of movement of a pointer before displaying a previously hidden graphical object.

FIG. 9 is a flow diagram of an exemplary process 900 for slowing a rate of movement of a pointer before displaying a hidden graphical object. A graphical object in a user interface is hidden from view (910). An input for moving a pointer across a virtual boundary is received (920). A rate of movement associated with the input is determined (930). Typically, movement of the pointer is displayed in the user interface at a rate of movement corresponding to the rate of movement of the input received from a user. Accordingly, the pointer depicted in the user interface moves at a velocity corresponding to the velocity at which a user enters input for movement of the pointer. Movement of the pointer is displayed at a displayed rate of movement that is slower than the rate of movement associated with the input (940). The slower rate of movement can give the user the impression of resistance of movement of the pointer in a region surrounding the virtual boundary. After the pointer crosses a second virtual boundary, the hidden graphical object is displayed (950). In certain instances, the movement of the pointer is returned to a normal rate of movement corresponding to the rate of movement associated with the input.

The above processes are merely examples. Various combinations of the above processes are possible.

Exemplary Device Architecture

Figure 10:
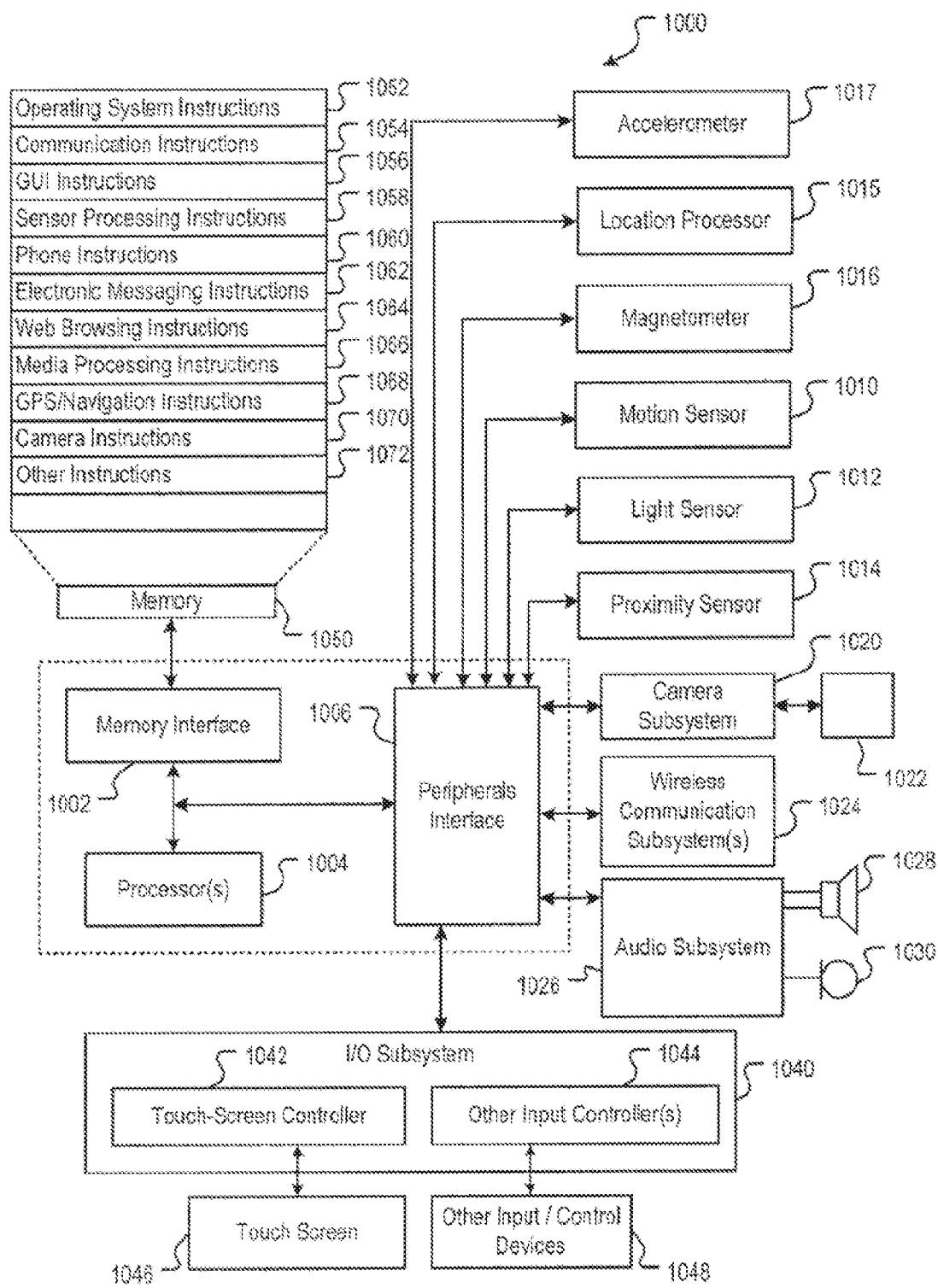
FIG. 10 is a block diagram of exemplary hardware architecture for implementing the user interfaces and processes described in reference to FIGS. 1-9.

FIG. 10 is a block diagram of exemplary hardware architecture 1000 for a device implementing the bridge view of virtual workspaces processes and interfaces described in reference to FIGS. 1-9. The device can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. The various components in the device, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Accelerometer 1017 can also be connected to peripherals interface 1006 to provide data that can be used to determine change of speed and direction of movement of the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a WI-FI or WIMAX network, and a BLUETOOTH network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to the device on or off. The user may be able to customize a functionality of one or more of the buttons. The touch screen 1046 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod™. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VXWORKS. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; and camera instructions 1070 to facilitate camera-related processes and functions. In particular, the graphical user interface instructions 1056 can facilitate the user interface features described in reference to FIGS. 1-9. The memory 1050 may also store other software instructions (not shown), such as security instructions, web video instructions to facilitate web video-related processes and functions, and/or web-shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can also include other instructions 1072.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., OBJECTIVE-C, JAVA), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a mouse or a trackball, or a pointing device (e.g., a finger or stylus on a touch-sensitive surface or touch-sensitive display) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps as disclosed herein can be implemented using an API. An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed:

1. A method, comprising
at an electronic device with a display and one or more input devices:
displaying a user interface on the display;
while displaying the user interface on the display, detecting, via the one or more input devices, an input that includes movement of an input in a first direction;
in response to detecting the input that includes the movement, in accordance with a determination that the movement of the input corresponds to crossing a first virtual boundary without crossing a second virtual boundary that is further from an edge of a visible area of the display than the first virtual boundary, displaying, on the display, a dock that includes a plurality of application icons for selecting applications to be displayed;
while displaying the dock on the display, detecting, via the one or more input devices, an additional input that includes additional movement of an input in the first direction; and
in response to detecting the additional input that includes the additional movement, in accordance with a determination that the additional movement of the additional input corresponds to crossing the second virtual boundary, updating the display to include the dock and additional affordances for further navigation that are associated with at least one different application that is different from applications associated with the plurality of application icons in the dock.

2. The method of claim 1, further comprising:
in response to detecting the input that includes the movement:
in accordance with a determination that the movement of the input does not correspond to crossing the first virtual boundary and does not correspond to crossing the second virtual boundary, forgoing displaying the dock and the additional affordances on the display.

3. The method of claim 1, further comprising:
prior to the movement of the input corresponding to crossing the first virtual boundary and in response to detecting the input that includes the movement, displaying, on the display, a portion of the dock that includes the plurality of application icons for selecting applications to be displayed.

4. The method of claim 3, further comprising:
after displaying the portion of the dock, detecting withdrawal of the input from a respective region of the user interface associated with the display of the portion of the dock, wherein detecting withdrawal of the input includes detecting the input crossing a third virtual boundary that corresponds to an edge of the respective region of the user interface; and
in response to detecting the withdrawal of the input from the respective region of the user interface, ceasing to display the portion of the dock on the display.

5. The method of claim 1, wherein the dock is displayed at a bottom of the display.

6. The method of claim 1, wherein displaying the dock on the display includes displaying an animation of the dock appearing to move onto the display from off of the display.

7. The method of claim 6, wherein the animation includes shifting the user interface upwards on the display as the dock moves upwards onto the display.

8. The method of claim 1, wherein the second virtual boundary is outside of the visible area of the display.

9. The method of claim 8, further comprising:
in response to detecting the input that includes the movement, displaying, on the display, movement of a cursor in the user interface in accordance with the movement of the input,
wherein movement of the cursor is not displayed in response to detecting the additional input.

10. An electronic device comprising:
one or more processors;
one or more input devices;
a display; and
memory storing instructions, which when executed by the one or more processors, cause the electronic device to perform a method comprising:
displaying a user interface on the display;
while displaying the user interface on the display, detecting, via the one or more input devices, an input that includes movement of an input in a first direction;
in response to detecting the input that includes the movement, in accordance with a determination that the movement of the input corresponds to crossing a first virtual boundary without crossing a second virtual boundary that is further from an edge of a visible area of the display than the first virtual boundary, displaying, on the display, a dock that includes a plurality of application icons for selecting applications to be displayed;
while displaying the dock on the display, detecting, via the one or more input devices, an additional input that includes additional movement of an input in the first direction; and
in response to detecting the additional input that includes the additional movement, in accordance with a determination that the additional movement of the additional input corresponds to crossing the second virtual boundary, updating the display to include the dock and additional affordances for further navigation that are associated with at least one different application that is different from applications associated with the plurality of application icons in the dock.

11. The electronic device of claim 10, the method further comprising:
in response to detecting the input that includes the movement:
in accordance with a determination that the movement of the input does not correspond to crossing the first virtual boundary and does not correspond to crossing the second virtual boundary, forgoing displaying the dock and the additional affordances on the display.

12. The electronic device of claim 10, the method further comprising:
prior to the movement of the input corresponding to crossing the first virtual boundary and in response to detecting the input that includes the movement, displaying, on the display, a portion of the dock that includes the plurality of application icons for selecting applications to be displayed.

13. The electronic device of claim 12, the method further comprising:
after displaying the portion of the dock, detecting withdrawal of the input from a respective region of the user interface associated with the display of the portion of the dock, wherein detecting withdrawal of the input includes detecting the input crossing a third virtual boundary that corresponds to an edge of the respective region of the user interface; and
in response to detecting the withdrawal of the input from the respective region of the user interface, ceasing to display the portion of the dock on the display.

14. The electronic device of claim 10, wherein the dock is displayed at a bottom of the display.

15. The electronic device of claim 10, wherein displaying the dock on the display includes displaying an animation of the dock appearing to move onto the display from off of the display.

16. The electronic device of claim 15, wherein the animation includes shifting the user interface upwards on the display as the dock moves upwards onto the display.

17. The electronic device of claim 10, wherein the second virtual boundary is outside of the visible area of the display.

18. The electronic device of claim 17, the method further comprising:
in response to detecting the input that includes the movement, displaying, on the display, movement of a cursor in the user interface in accordance with the movement of the input,
wherein movement of the cursor is not displayed in response to detecting the additional input.

19. A non-transitory computer-readable medium storing instructions, which when executed by one or more processors of an electronic device with a display and one or more input devices, cause the electronic device to perform a method comprising:
displaying a user interface on the display;
while displaying the user interface on the display, detecting, via the one or more input devices, an input that includes movement of an input in a first direction;
in response to detecting the input that includes the movement, in accordance with a determination that the movement of the input corresponds to crossing a first virtual boundary without crossing a second virtual boundary that is further from an edge of a visible area of the display than the first virtual boundary, displaying, on the display, a dock that includes a plurality of application icons for selecting applications to be displayed;
while displaying the dock on the display, detecting, via the one or more input devices, an additional input that includes additional movement of an input in the first direction; and
in response to detecting the additional input that includes the additional movement, in accordance with a determination that the additional movement of the additional input corresponds to crossing the second virtual boundary, updating the display to include the dock and additional affordances for further navigation that are associated with at least one different application that is different from applications associated with the plurality of application icons in the dock.

20. The non-transitory computer-readable medium of claim 19, the method further comprising:
in response to detecting the input that includes the movement:
in accordance with a determination that the movement of the input does not correspond to crossing the first virtual boundary and does not correspond to crossing the second virtual boundary, forgoing displaying the dock and the additional affordances on the display.

21. The non-transitory computer-readable medium of claim 19, the method further comprising:
prior to the movement of the input corresponding to crossing the first virtual boundary and in response to detecting the input that includes the movement, displaying, on the display, a portion of the dock that includes the plurality of application icons for selecting applications to be displayed.

22. The non-transitory computer-readable medium of claim 21, the method further comprising:

after displaying the portion of the dock, detecting withdrawal of the input from a respective region of the user interface associated with the display of the portion of the dock, wherein detecting withdrawal of the input includes detecting the input crossing a third virtual boundary that corresponds to an edge of the respective region of the user interface; and in response to detecting the withdrawal of the input from the respective region of the user interface, ceasing to display the portion of the dock on the display.

23. The non-transitory computer-readable medium of claim 19, wherein the dock is displayed at a bottom of the display.

24. The non-transitory computer-readable medium of claim 19, wherein displaying the dock on the display includes displaying an animation of the dock appearing to move onto the display from off of the display.

25. The non-transitory computer-readable medium of claim 24, wherein the animation includes shifting the user interface upwards on the display as the dock moves upwards onto the display.

26. The non-transitory computer-readable medium of claim 19, wherein the second virtual boundary is outside of the visible area of the display.

27. The non-transitory computer-readable medium of claim 26, the method further comprising:
in response to detecting the input that includes the movement, displaying, on the display, movement of a cursor in the user interface in accordance with the movement of the input,
wherein movement of the cursor is not displayed in response to detecting the additional input.

\* \* \* \* \*